(12) United States Patent
Blomquist et al.

(10) Patent No.: US 12,409,440 B1
(45) Date of Patent: Sep. 9, 2025

(54) SEPARATION MODULE

(71) Applicant: SPF Technologies LLC, Somerville, MA (US)

(72) Inventors: Erik O. Blomquist, Jamaica Plain, MA (US); Gaston De Los Reyes, Somerville, MA (US)

(73) Assignee: SPF TECHNOLOGIES LLC, Somerville, MA (US)

( * ) Notice: Subject to any disclaimer, the term of this patent is extended or adjusted under 35 U.S.C. 154(b) by 49 days.

(21) Appl. No.: 18/386,944

(22) Filed: Nov. 3, 2023

Related U.S. Application Data

(60) Continuation-in-part of application No. 17/871,086, filed on Jul. 22, 2022, now Pat. No. 11,845,059,
(Continued)

(51) Int. Cl.
*B01D 15/20* (2006.01)
*B01D 15/22* (2006.01)
(Continued)

(52) U.S. Cl.
CPC .......... *B01J 20/281* (2013.01); *B01D 15/206* (2013.01); *B01D 15/22* (2013.01); *B33Y 10/00* (2014.12); *B33Y 80/00* (2014.12); *G01N 30/52* (2013.01); *G01N 30/6043* (2013.01); *G01N 30/6047* (2013.01); *B01J 20/28016* (2013.01); *B01J 20/28042* (2013.01); *B01J 20/282* (2013.01);
(Continued)

(58) Field of Classification Search
CPC ................ B01J 20/281; B01J 20/28016; B01J 20/28042; B01J 20/282; B33Y 10/00; B33Y 80/00; B01D 15/206; B01D 15/22; G01N 30/52; G01N 30/6043; G01N 30/6047; G01N 30/6069; G01N 30/6095; G01N 2030/527; G01N 2030/528
See application file for complete search history.

(56) References Cited

U.S. PATENT DOCUMENTS 3,340,085 A 9/1967 Halasz et al.
3,422,604 A 1/1969 Haase
(Continued)

FOREIGN PATENT DOCUMENTS

FR 2645965 A1 10/1990
JP 2006090813 A 4/2006
(Continued)

OTHER PUBLICATIONS

EP Supplementary Search Report, 14836168.6-1554/3033157, dated Mar. 24, 2017, pp. 14.
(Continued)

*Primary Examiner* — Benjamin L Lebron
(74) *Attorney, Agent, or Firm* — Barry Gaiman

(57) ABSTRACT

Methods and devices are disclosed for a separation device. A separation device includes a plurality stacked modules and a distribution network including an inter-module LEVEL-1 distributor an intermediate LEVEL-2 distributor and a planar LEVEL-3 distributor. The distribution network enables streamline lengths which are approximately equal and induces uniform velocity fluid flow. These features provide a narrow residence time distribution providing improved chromatographic performance.

26 Claims, 20 Drawing Sheets

Related U.S. Application Data which is a continuation of application No. 16/715,415, filed on Dec. 16, 2019, now Pat. No. 11,395,980, which is a continuation-in-part of application No. 16/543,655, filed on Aug. 19, 2019, now Pat. No. 11,219,844, which is a division of application No. 15/456,484, filed on Mar. 11, 2017, now Pat. No. 10,391,423, which is a continuation-in-part of application No. 14/907,804, filed on Jan. 26, 2016, now Pat. No. 9,599,594.

(60) Provisional application No. 63/425,062, filed on Nov. 14, 2022, provisional application No. 62/307,467, filed on Mar. 12, 2016.

(51) Int. Cl.
| | |
|---|---|
| *B01J 20/28* | (2006.01) |
| *B01J 20/281* | (2006.01) |
| *B01J 20/282* | (2006.01) |
| *B33Y 10/00* | (2015.01) |
| *B33Y 80/00* | (2015.01) |
| *G01N 30/52* | (2006.01) |
| *G01N 30/60* | (2006.01) |

(52) U.S. Cl.
CPC . *G01N 2030/527* (2013.01); *G01N 2030/528* (2013.01); *G01N 30/6069* (2013.01); *G01N 30/6095* (2013.01)

(56) References Cited

U.S. PATENT DOCUMENTS

| | | | |
|---|---|---|---|
| 3,503,712 | A | 3/1970 | Sussman |
| 4,671,871 | A | 6/1987 | Szekely |
| 4,971,736 | A | 11/1990 | Hagen et al. |
| 5,248,428 | A | 9/1993 | Hagen et al. |
| 5,683,916 | A | 11/1997 | Goffe et al. |
| 5,800,706 | A | 9/1998 | Fischer |
| 6,068,684 | A | 5/2000 | Overton |
| 7,947,175 | B2 | 5/2011 | Shinkazh |
| 7,988,859 | B2 | 8/2011 | Shinkazh |
| 9,599,594 | B2 | 3/2017 | de Los Reyes |
| 9,802,979 | B2 | 10/2017 | Bracewell et al. |
| 10,391,423 | B2 * | 8/2019 | de los Reyes ......... B01D 15/22 |
| 11,395,980 | B2 * | 7/2022 | de los Reyes ......... B01J 20/281 |
| 2001/0032814 | A1 | 10/2001 | Kearney et al. |
| 2003/0150806 | A1 | 8/2003 | Hobbs et al. |
| 2003/0155300 | A1 | 8/2003 | Afeyan et al. |
| 2005/0006293 | A1 | 1/2005 | Koehler et al. |
| 2006/0014274 | A1 | 1/2006 | Klaus |
| 2007/0151924 | A1 | 7/2007 | Mir et al. |
| 2007/0151925 | A1 | 7/2007 | de los Reyes et al. |
| 2008/0017579 | A1 | 1/2008 | Hemansson |
| 2008/0135484 | A1 | 6/2008 | Hammer |
| 2008/0148936 | A1 | 6/2008 | Baksh |
| 2008/0236389 | A1 | 10/2008 | Leedy et al. |
| 2008/0283458 | A1 | 11/2008 | Ishii et al. |
| 2009/0321338 | A1 | 12/2009 | Natarajan |
| 2010/0187167 | A1 | 7/2010 | Reinbigler et al. |
| 2010/0222570 | A1 | 9/2010 | Ratnam et al. |
| 2011/0108522 | A1 | 5/2011 | Rozing |
| 2011/0206572 | A1 | 8/2011 | Mckenna et al. |
| 2011/0217539 | A1 | 9/2011 | Bonner et al. |
| 2012/0097591 | A1 | 4/2012 | Berthold et al. |
| 2012/0118807 | A1 | 5/2012 | Natarajan |
| 2012/0309053 | A1 | 12/2012 | Wellings |
| 2013/0020263 | A1 | 1/2013 | Gebauer et al. |
| 2013/0068671 | A1 | 3/2013 | Gebauer et al. |
| 2013/0197200 | A1 | 8/2013 | Bian et al. |
| 2014/0339170 | A1 | 11/2014 | de Los Reyes |
| 2016/0257033 | A1 | 9/2016 | Jayanti et al. |

FOREIGN PATENT DOCUMENTS

| | | |
|---|---|---|
| JP | 2014032134 A | 2/2014 |
| WO | 9005018 A1 | 5/1990 |
| WO | 9203206 A1 | 3/1992 |
| WO | 2012104278 A1 | 8/2012 |

OTHER PUBLICATIONS

International Search Report and the Written Opinion, PCT/US2014050743, dated Nov. 20, 2014, pp. 10.

JP Office Action dated Oct. 16, 2018, Japanese Patent Application No. 2017-006413, 10 Pages.

Maksimova, E.F., et al. "Methacrylate-based monolithic layers for planar chromatography of polymers," Journal of Chromatography A, 1218: 2425-2431 (2011). Available online Dec. 21, 2010.

Ng, Candy K.S.., et al. "Design of high productivity antibody capture by protein A chromatography using an integrated experimental and modeling approach," Journal of Chromatography B, 899 116-126 (2012). Available online May 14, 2012.

Siwak, M., et al. "Integration of a novel modular chromatography scaffold and resin design to achieve a Hyper Productive Protein A capture process". PowerPoint slides. Presented at ACS BIOT San Diego, Mar. 13-17, 2016.

Svec, F., et al. "Molded rigid monolithic porous polymers: an inexpensive, efficient, and versatile alternative to beads for the design of materials for numerous applications," Ind. Eng. Chem. Res., 38: 34-48 (1999).

* cited by examiner

SEPARATION MODULE

RELATED APPLICATIONS

This application claims the benefit of Provisional Application Ser. No. 63/425,062, entitled SEPARATION MODULE filed Nov. 14, 2022 which application is hereby incorporated herein by reference in its entirety. This application is a continuation in part of and claims the benefit of pending application Ser. No. 17/871,086 now U.S. Pat. No. 11,845,059 granted Dec. 19, 2023 entitled CHROMATOGRAPHIC CASSETTE filed Jul. 22, 2022 which application is a continuation of and claims the benefit of application Ser. No. 16/715,415, now U.S. Pat. No. 11,395,980 granted Jul. 26, 2022 entitled STACKABLE PLANAR ADSORPTIVE DEVICES, filed Dec. 16, 2019 which application is a continuation in part of and claims the benefit of application Ser. No. 16/543,655, now U.S. Pat. No. 11,219,844 granted Jan. 11, 2022 entitled STACKABLE PLANAR ADSORPTIVE DEVICES, filed Aug. 19, 2019 which is a Continuation Application of application Ser. No. 15/456,484, entitled STACKABLE PLANAR ADSORPTIVE DEVICES, filed Mar. 11, 2017, now U.S. Pat. No. 10,391,423, granted Aug. 27, 2019, which claims the benefit of U.S. Provisional Application No. 62/307,467, entitled STACKABLE PLANAR ADSORPTIVE DEVICES, filed Mar. 12, 2016 and is a Continuation-in-part and claims the benefit of application Ser. No. 14/907,804 filed Jan. 26, 2016, entitled STACKABLE PLANAR ADSORPTIVE DEVICES, now U.S. Pat. No. 9,599,594, granted March 21 which applications are hereby incorporated herein by reference in their entireties.

FIELD OF THE INVENTION

The field of this invention is related to adsorptive devices and processes, of which chromatography is an example. More specifically, this invention relates to modular adsorptive devices or modular chromatography, including an array of modules which are assembled in a parallel or parallel/serial configuration into a larger adsorptive device.

BACKGROUND OF INVENTION

Adsorptive processes and devices are widely used in the analysis and purification of chemicals, including synthetic and naturally-derived pharmaceuticals, blood products and recombinant proteins. Chromatographic methods include among other methods, gel chromatography, ion exchange chromatography, hydrophobic interaction chromatography, reverse phase chromatography, affinity chromatography, immuno-adsorption chromatography, lectin affinity chromatography, ion affinity chromatography and other such well-known chromatographic methods.

Adsorptive media come in many forms, most typically in the form of beads. The beads are conventionally packed into columns, with the column walls and ends immobilizing the beads into a fixed adsorptive bed, a bed being a porous three-dimensional structure containing the stationary phase (in this case the beads) the space through which the mobile phase flows/permeates between the beads (the interstitial space), and the pore space within the beads, permeated by the mobile phase and accessible to the target solutes through diffusion.

Membrane-based adsorptive devices have been developed. In these devices the adsorptive medium is either supported by or embedded into a flat micro-porous membrane or a non-woven web, which is then fabricated into adsorptive devices (hereafter "web-based media" and "web-based devices"). Two or more of these membranes or webs are stacked to form an adsorptive bed with a longer flow path; however, the number of layers that can be stacked is limited by the low hydraulic permeability of microfiltration membranes. Such filtration devices are characterized by the fact that the fluid being treated flows through the adsorptive medium in a direction substantially perpendicular to the planar dimension of the medium. The virtue of membrane or web-based adsorbers is their fast kinetics, enabling them to have short bed depths and high feed rates. Adsorptive media is formed into cohesive beds that retain their shape by virtue of the cohesion in the media. This type of adsorptive medium is referred to as monolithic medium, monolithic substrate or simply as a monolith.

Chromatography is conventionally practiced with a single column whose size/volume is determined by the processing capacity required. Columns of different diameter and height are sold and these are packed with the desired adsorptive media into a single chromatographic bed. Recently modular chromatography with pre-packed modules has emerged as a highly desirable format due to the many advantages provided by modularity. In modular chromatography modules having an adsorptive medium volume of 100 mL to several liters are assembled into larger arrays of modules fluidically in-parallel or parallel/series configuration.

The same attributes that confer membrane or monolithic media with fast kinetics also limit their capacity. Additionally, the intrinsic geometry of existing membrane adsorbers limits their scalability, the largest ones typically being no larger than 5 liters. Furthermore, the bed depth, or absorptive path length, important in purification steps requiring resolution, is limited in membrane-based devices due to the low hydraulic permeability of microporous membranes. Membrane absorptive media are expensive, because of the high cost of the membrane substrate and the challenges of functionalizing the membrane surface with absorptive chemistry. Finally, membrane-based adsorptive devices inherently have low capacity, and as a result membrane adsorption devices have found applicability primarily in "polishing" steps (e.g., virus and DNA removal) where the adsorptive load is negligible, rather than in primary purification steps.

Planar, stackable, and modular adsorptive devices have also been developed for bead-based media under the tradename Chromassette® and for membrane-based media under the tradename ChromaWeb® (registered trademarks of SPF Technologies LLC), respectively, see U.S. Pat. Nos. 8,506,802, 9,120,037, 9,599,594 and 11,395,980. These modular chromatography devices (hereafter "modular devices") deliver significant benefits over conventional chromatographic columns: the modules or cassettes are delivered to the end-user pre-packed, are linearly scalable, have high chromatographic resolution (making them suitable for primary capture steps), can be assembled by the end-user by stacking the modules into larger adsorptive units of sizes to fit the process capacities required (referred to by those skilled in the art as "right sizing"), or can be purchased as pre-assembled ready-to-use "blocks" (i.e., assembly of multiple modules). Other examples of modular chromatography are Sartobind® cassettes, membrane-based devices stacked in parallel arrays (Sartorius Corporation). Modular chromatography can also be practiced with small conventional columns assembled into a parallel array to form a larger adsorptive unit as described by U.S. Pat. No. 10,830,740 (Gebauer).

The significant benefits of modular chromatography are leading many drug manufacturers to evaluate them for adoption into their processes. Sartobind cassettes are already widely adopted in polishing applications, where low-level contaminants are removed from a solution of a highly purified therapeutic agent. However, these cassettes do not have good resolution and would not be useful for chromatographic separations requiring high resolution, such as is required for primary capture using affinity chromatography, or is required to purify streams using elution chromatography.

For modular chromatography to become widely adopted in high-resolution chromatographic processes the module array needs to meet certain requirements:
1. Each module comprising the array must have high chromatographic resolution (hereafter, high resolution).
2. Each module comprising the array must be substantially similar to each other, having substantially similar retention volumes and substantially similar hydraulic resistance (HR).

For example, similar modules having excellent chromatographic resolution but different hydraulic resistance would result in a parallel array that does not have good chromatographic resolution. Therefore, not only does each module need to have good chromatographic resolution and similar hydraulic resistance to every other module in the parallel array, but also the flow into the array needs to be evenly distributed among the modules, otherwise the chromatographic resolution of the array is impaired.

Some attempts have been made to address this issue with modular conventional columns. U.S. Pat. No. 10,933,350 "Parallel assembly of chromatography column modules" (inventor Klaus Gebauer for assignee Cytiva Corporation) discloses a parallel assembly of chromatography columns adapted with adjustable flow restrictors downstream of each column such that each flow restrictor is adjusted to impart the same hydraulic resistance of each individual flow path. The act of adjusting the hydraulic resistance of the assembly is referred to by Gebauer as "synchronization" of the hydraulic resistance of the parallel assembly.

U.S. patent application No. 20190234914 by (Williams et. al.) entitled "Chromatography System," discloses the use of converging distributors, with emphasis on the "draft angle" to "accelerate the flow of fluid" with the objective of reducing the "time difference or time lag between when the different sections of the adsorbent chromatography medium 12 are exposed to the fluid).

One set of common chromatographic structures are the radial flow devices, as for example, Sartobind® capsules (Sartorius Inc. Göttingen, Germany) and BIA CIM® capsules (BIA Separations, Ajdovščina, Slovenia), where the adsorptive bed is an annular cylinder and the flow is radial, in these two examples, from the outside of the cylindrical annulus to the inside. Another such common bed structure is used with conventional chromatography columns, for example Opus® Columns (Repligen Inc., Watertown, Massachusetts), where the adsorptive bed is a cylinder and the flow is axial.

Modular chromatographic devices have been disclosed in U.S. Pat. Nos. 8,506,802 and 11,395,980 (de los Reyes). One key element of these devices is planarly cohesive media enabling stackability and linear scalability.

SUMMARY OF THE INVENTION

The special demands imposed on pharmaceutical manufacturing processes make it highly desirable that such processes be easily scaled-up. There are many advantages to processes that can be scaled-up without having to reset or redevelop the processing conditions. Such processes are referred to in the industry as linearly-scalable processes; in essence, the parameters that define the separation process and operating conditions remain unchanged as the process moves from the laboratory bench (i.e., discovery), the chromatographic device can be as small as several milliliters, to the process development laboratory where the adsorptive medium of the chromatographic device has a volume of a hundreds of milliliters, to clinical manufacturing where the adsorptive medium of the chromatographic device has a volume of up to 5 liters, to large-scale manufacturing, where the chromatography device can be as large as several hundred liters. The development of linearly-scalable adsorptive devices solves the scale-up problem. However, modular arrays need also to be isoflo arrays (described below in more detail) if they are to be used in chromatographic processes that require resolution.

Embodiments disclosed herein include adjusting the HR of a module. In one embodiment (referred to as Type-1) the HR adjustment relies on the controlled plugging of a hydraulic element in the modular device (e.g., the packing retainer in bead-based devices) the top or bottom membrane/web in web-based devices; the upstream or downstream end of the monolith in monolithic devices. In a second type (Type-2) the HR adjustment relies on a fluidic element embedded in the flow path of the module whose flow resistance is adjustable. The adjustable fluidic element is in the upstream or downstream end of the adsorptive bed. Type-1 embodiments rely on particulate suspensions to effect controlled plugging of some fluidic element of the adsorptive module. In all cases the HR of each module is increased to get all modules being assembled into a single array to have the same HR and thereby obtain an isoflo array.

In one embodiment, a system includes a feed end plate, having a feed port, a plurality of fluidly connected, substantially similar modules stacked adjacent to the feed end plate and fluidly coupled to the feed port, an eluent end plate having an eluent port, disposed opposite the feed end plate with the plurality of fluidly connected, substantially similar modules disposed in between the feed end plate and the eluent end plate. Each one of the plurality of substantially similar modules includes: a chromatographic media bed having first and second planar surfaces and a distribution network. The distribution network includes an inter-module (LEVEL-1) distributor pair adjacent to the chromatographic media bed, a first one of the inter-module LEVEL-1 distributor pair having at least one passageway substantially perpendicular to the first and second planar surfaces and fluidly coupled to the feed port and second one of the inter-module LEVEL-1 distributor pair having at least one different passageway substantially perpendicular to the first and second planar surfaces and fluidly coupled to the eluent port; an intermediate (LEVEL-2) distributor pair, a first one and a second one of the LEVEL-2 distributor pair disposed on opposite sides of the chromatographic media bed, having an array of passageways approximately parallel to the planar surfaces and fluidly coupled to a corresponding one of the inter-module LEVEL-1 distributor pair; and a planar (LEVEL-3) distributor pair, each of a first one and a second one of the planar LEVEL-3 distributor pair fluidly coupled to the respective first and second ones of the intermediate LEVEL-2 distributor pair and each one of the pair having an array of passageways parallel to the first and second planar surfaces, the first one of the pair in contact with the first surface of the chromatographic media bed and the second one of the pair in contact with the second surface of the chromatographic media bed.

In another embodiment, each one of the pair of each distributor pair LEVEL-1, LEVEL-2 and LEVEL-3, is substantially identical to the other one of the distributor pair and is rotated 180° about an axis perpendicular to the sides of a module and located on the opposite ends (opposite faces) from the other one of the distributor pair. In yet another embodiment, each of the first and second intermediate LEVEL-2 distributor pair is an isoflo distributors.

In another embodiment, a cross sectional flow area of each one of the planar LEVEL-3 distributor pair converges approximately linearly from a first end down to approximately zero at a second end oppositely disposed from the first end, inducing a fluid to have a uniform velocity. In a further embodiment, a cross sectional flow area convergence towards at least 20% of its initial value inducing an approximately uniform velocity. In a further embodiment, each of a first one and a second one of the planar LEVEL-3 distributor pair further includes one of: an array of channels; a non-woven spacer with a converging cross sectional flow area; an array of woven spacers; and an array of woven spacers with a converging cross sectional flow area.

In yet another embodiment, each of the plurality of fluidly connected, substantially similar modules further include a first module plate and a second module plate disposed adjacent the first and second planar surfaces of the chromatographic media bed and respective ones of the intermediate LEVEL-2 distributor pair and the planar LEVEL-3 distributor pair are embedded in the respective first and second module plates. A further embodiment includes a peripheral seal, encapsulating the chromatographic media bed, and the seal structurally coheres the first and second module plates to the chromatographic media bed;

the chromatographic media bed being brought in contact with the first and second module plates prior to encapsulation by one of: compression of the chromatographic media bed by the first and second module plates to a target compressive stress level such that subsequent fluid forces do not further deform the bed; and compression of the chromatographic media bed by the first and second module plates to deflect it to a target bed depth. In a still further embodiment, the peripheral seal intrudes into the chromatographic media bed in a peripheral seal offset region such that a fluid dead zone, in the peripheral seal offset region, is substantially eliminated. In a still further embodiment, the first module plate and the second module plate include a media-bite to prevent intrusion of the peripheral seal into the planar distributors and the peripheral seal includes at least one of: epoxy, urethane, thermoplastic polymers, and silicone. In another embodiment, each of the plurality of fluidly connected, substantially similar modules further includes at least one permeable substantially rigid sheet sandwiched between at least one of the first and second planar surfaces of at least one bed of the chromatographic media and the respective planar distributor.

In another embodiment, the distribution network induces a plurality of streamlines having approximately equal lengths. In yet another embodiment, a hydraulic resistance of one of the plurality of fluidly connected, substantially similar modules is adjusted to a target value substantially equal to another different one of the plurality of fluidly connected, substantially similar modules by one of: controlled plugging of the media in the chromatographic bed with a dispersion of solids; and adjustment of an adjustable hydraulic resistor embedded within the intermediate LEVEL-2 distributor pair. In yet another embodiment, the chromatographic media bed is one of: an adsorptive woven web; an adsorptive non-woven web; an adsorptive membrane; an adsorptive monolith; adsorptive beads packed in a monolith; and adsorptive beads packed in a lattice. In another embodiment, the feed end plate and eluent end plate further include a LEVEL-0 distributor that connects the respective feed and eluent ports to the inter-module LEVEL-1 distributor pair. In another embodiment, a cross sectional flow area of one of the passageways of the array of passageways of the inter-module LEVEL-1 distributor pair adjacent the feed end plate converges approximately linearly from the feed module plate towards the eluent module plate, and a cross sectional flow area in the other one of the passageways of the inter-module LEVEL-1 distributor pair adjacent the second end converges approximately linearly away from the eluent module plate towards the feed module plate, inducing a fluid flow to have a uniform velocity. In another embodiment, at least one of the plurality of substantially similar modules further includes a plurality of interconnected submodules. In a further embodiment, at least one of the plurality of interconnected submodules includes multiple chromatographic media beds within each module.

A technique includes providing a modular chromatographic system having a plurality of stacked modules, each stacked module including a chromatographic media bed having first and second planar surfaces and including a multilevel distribution network of each stacked module; distributing a feed stream to the chromatographic media bed, a flow through the multilevel distribution network induces a plurality of streamlines having approximately equal lengths; inducing an isomikos flow through the multilevel distribution network; and collecting an eluent stream from the chromatographic media bed. The technique further includes adjusting a hydraulic resistance of each of the plurality of stacked modules to a target value substantially equal to that of all the other modules in the plurality of stacked modules. The technique further includes adjusting the hydraulic resistance of each one of the plurality of stacked modules by one of: controlled plugging with a dispersion of solids; adjustment of an adjustable hydraulic resistor in the multilevel distribution network; and insertion of hydraulic resistors of varying resistances in the multilevel distribution network of each stacked module. The technique further includes flowing a dilute dispersion of inert solid particles into a fluid inlet of each module, a size of the inert solid particles selected to enable them to fit into a porous structure of the chromatographic media bed and disposed to stay trapped within the porous structure; measuring a feed pressure; and continuing to flow the dilute dispersion until the feed pressure reaches a feed pressure corresponding to a target value of the hydraulic resistance. The technique further includes injecting a backflushing liquid free of particulate solids into a fluid outlet of the module at a predetermined feed pressure, flow rate and time to remove solid particles that did not get trapped within the porous structure. In a further technique the backflushing liquid is selected from at least one or a mixture of: deionized (DI) water; an aqueous buffer; and an organic solvent miscible with water.

Embodiments described herein include stackable web or monolithic chromatography modules with high resolution and these embodiments obtain a high chromatographic resolution in a module by virtue of the module geometry and the design of its flow distribution network to yield a very uniform residence time distribution (hereafter RTD). Other embodiments described herein include modular parallel arrays of stacked web or monolithic chromatography modules (also referred to as cassettes) having high resolution, similar to the resolution of the individual modules comprising the array. In other embodiments high resolution of the modules in a modular parallel array is maintained by adjustment of the hydraulic resistance (HR) (of each module comprising the array, such that the flow through the array distributes substantially equally among all modules. Other embodiments include linearly-scalable modules over a wide dynamic range of adsorptive media volumes of about 10 milliliters to tens of liters. Modular parallel arrays having substantially equal flow through each module is described hereafter as modular isoflo arrays or isoflo arrays. Processes for the fabrication of modular web and monolithic chromatography modules that are linearly-scalable and with high resolution are described below.

Adjustment of the HR is integrated into each module, such that the module requires no additional external element to obtain an isoflo array. The HR of the modules is adjustable at the factory, prior to shipping the modules to the end-user, such that when these modules are assembled into an array, the array is an isoflo array without any other intervention by the end-user. Methods and apparatus for the adjustment of the HR in modular adsorptive devices for packed beads (bead-based devices), membranes and/or non-woven webs (web-based devices) or monolithic media (monolith-based devices) are described below.

BRIEF DESCRIPTION OF THE SEVERAL VIEWS OF THE DRAWINGS

The foregoing and other aspects, embodiments, objects, features and advantages of the present teachings can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present teachings. The following drawings are illustrative of embodiments of the invention and are not meant to limit the scope of the invention as encompassed by the claims.

DETAILED DESCRIPTION

Figure 1:
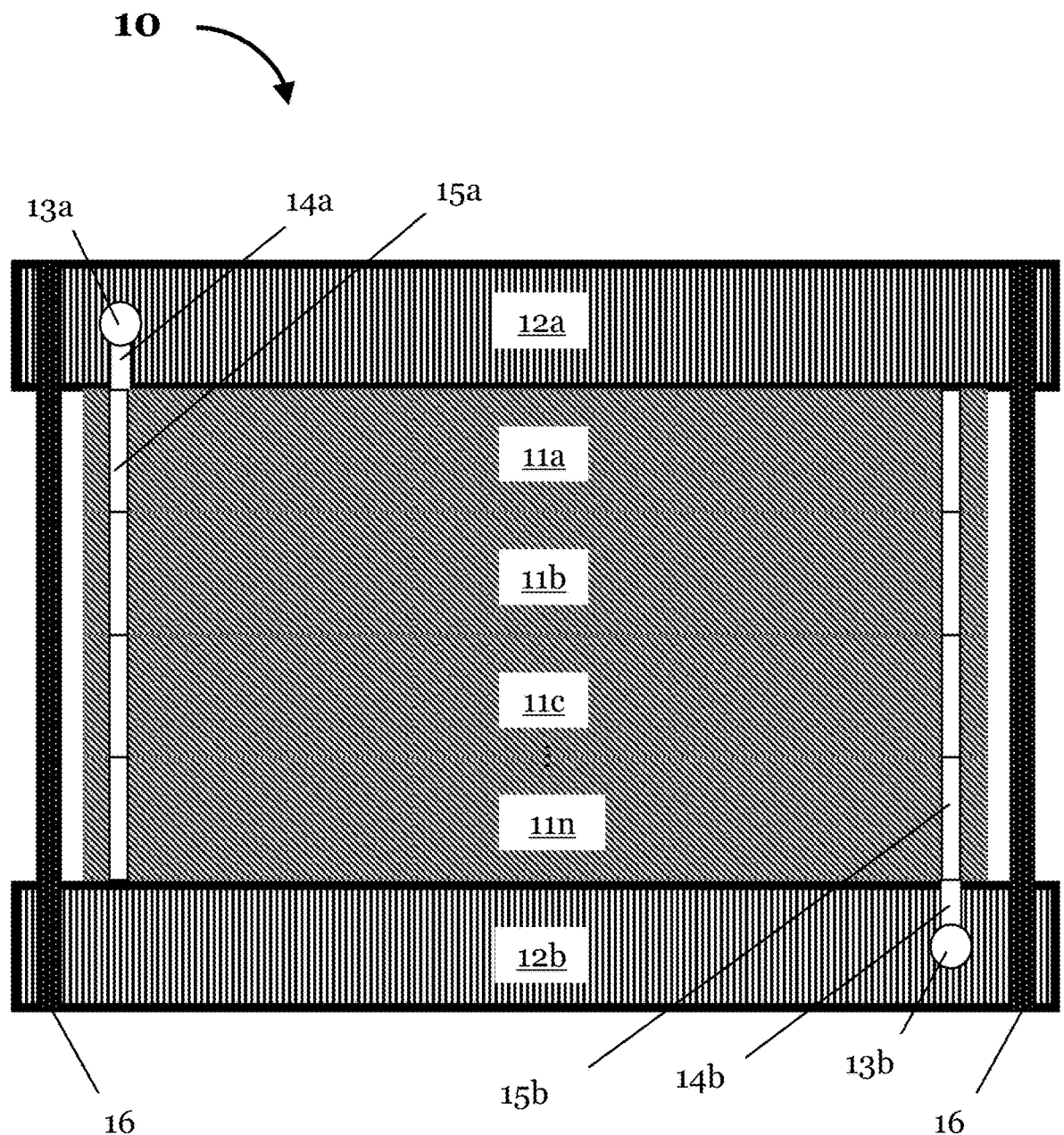
FIG. 1 is a schematic cross section in an XZ plane of an exemplary chromatography system, according to one embodiment disclosed herein.

One key to good chromatographic performance is a narrow residence time distribution. Key features of a distribution network which enables narrow residence time distribution include in various embodiments:
1. Very low extra-bed volume (e.g., approximate 7% of the total bed volume in a ChromaWeb);
2. Streamlines having approximately the same path length (referred to hereinafter as isomikos distribution);
3. Fluids having approximately constant velocity in a planar distributor; and
4. Approximately constant ΔP (pressure) across a chromatographic bed which enables uniform flow within the chromatographic bed.

These features are described below in more detail.

High Resolution Distributors in Shallow-Bed Chromatographic Modules

Fluidic devices are characterized as having a certain residence time distribution (RTD). Although those skilled in the art understand what residence time and its distribution means, a brief primer is in order. Each infinitesimal fluid element entering a fluidic device follows a certain pathway as it travels from inlet to outlet, this pathway is called a fluid streamline (hereafter streamline). Each streamline is further characterized by a certain path length, hereinafter the streamline length, and a certain time as it traverses from inlet to outlet, hereinafter the residence time. Since there is an almost infinite plurality of possible streamlines, there is a distribution of streamline lengths as well as a distribution of residence times. Some paths are longer (or shorter) than others, and some paths take a longer (or shorter) time to traverse from inlet to outlet.

Resolution is an essential characteristic of a chromatographic device. The higher the resolution of a chromatographic device the more effective the separation, resulting in higher yield, higher purity, lower buffer consumption and higher productivity. Therefore, increasing the resolution of a chromatographic process is of paramount importance. There are several factors that determine the resolution of a chromatographic separation, which can be grouped into three categories:
1. The selectivity of the adsorptive media, such that the higher the selectivity the better resolution. Selectivity is the result of the interaction between the adsorptive media and the target solute(s), and a function of their respective chemistries;
2. The diffusional lag time (or resistance) induced by the distance between the convective pathway of the fluid flowing through the adsorptive media and the adsorptive sites, such that the shorter the diffusional distances the better resolution; and
3. The RTD of the convective flow, the more uniform the residence time of the plurality of infinite streamlines, the narrower the RTD the better the resolution.

No matter how effective the selectivity of the adsorptive medium, or how short the diffusional lag time, if the RTD is broad, the resolution is poor. Whereas selectivity is determined by the chemistry of the media and the diffusional lag time is determined by the pore structure of the media, the residence time is determined by the device itself (i.e., the structure, geometry, and the design of the fluid distributors in conjunction with the uniformity of the hydraulic resistance of the adsorptive bed formed by the adsorptive media). If the adsorptive bed has uniform hydraulic resistance, then the resolution is determined by the device geometry and design. Since the adsorptive medium can form an adsorptive bed having a uniform hydraulic resistance, embodiments disclosed herein are directed to module and distributor designs and fabrication processes for obtaining a uniform module-to-module HR.

The modular devices disclosed herein referred to as modules or cassettes are stackable, enabling the assembly of a parallel array of modules into a single adsorptive unit, hereinafter a chromatography system or system, to meet the size demands of the chromatographic process. The modules and the system disclosed herein are further characterized by being linearly scalable and having substantially similar high resolution. Linear scalability is the capability of an array of N modules to deliver substantially the same performance as an individual module operated at 1/Nth of the flow of the system. Linear scalability is very valuable to practitioners as it enables them to scale up without having to change the process conditions and expecting the same results, the only difference being the volume and flow rate of fluid being processed.

Modules, cassettes, and systems disclosed herein are also characterized by having high (chromatographic) resolution. One key to high resolution is having a narrow RTD both within each module, and within the system (i.e., the array of modules). The modules and systems described herein achieve a narrow RTD by virtue of the geometry of the module, and the design of the distribution network following two distinct design criteria:
1. All streamlines have substantially the same length, a property that hereafter is called isomikos, for example, isomikos flow, isomikos configuration, isomikos distributor pairs, etc.
2. All streamlines have substantially the same residence time, a property that hereafter is called isochronous, for example, isochronous flow, isochronous configuration, isochronous distributor pairs, etc.

While it is in principle possible to have a uniform RTD without having an isomikos configuration, the embodiments described here substantially strive to have an isomikos configuration. It is noted that it is well known to those skilled in the art that all fluids cling to or adsorb onto the walls of the passageways carrying them, such that when the fluid is flowing within the passageway the velocity at the wall is zero, increasing as the distance from the walls increases. This phenomenon, characteristic of all fluids (liquids as well as gases) inevitably generates a broad residence time distribution even in a distributor with a single passageway (i.e., the fluid clinging to the walls does not move, and therefore theoretically, takes forever to exit). There is almost nothing that can be done to eliminate the non-uniformity in the residence time distribution induced by the fluid clinging to the passageway walls. Referring to the residence time distribution herein means residence time distribution of the average velocity within the flow passageways, treating the fluid as a plug that does not cling to the walls (i.e., "inviscid flow" as is known in the art). Accordingly, references to a narrow, or uniform, residence time distribution refer to a narrow residence time distribution of the average velocity of the fluid as the fluid flows through a plurality of streamlines in parallel to each other.

Isomikos Distributor Pairs

As will become apparent from the figures, the modules and systems disclosed herein include a distribution network having at least three levels of distributors, each level comprising isomikos distributor pairs. Each pair is substantially identical, configured anti-symmetrically on opposite ends or opposite faces of a module, or on both opposite ends and opposite faces. Except for the isoflo planar distributors, the fluid moves in the same direction (hereafter iso-directional flow). The face of a module is the side that characterizes the planar nature of the module. It is noted that a first distributor of the distributor pair feeds the the feed stream and a second distributor of the distributor pair collects the eluent.

In one embodiment, there are three distributor levels within each module are:

LEVEL-1—Inter-module distributors.
LEVEL-2—Intermediate (intra-module) distributors.
LEVEL-3—Planar (intra-module) distributors.

A system can also include a fourth distribution level, distributors at the level of a module stack or module array, and designated herein as LEVEL-0 distributors. Since the module stack includes feed and eluent end plates to hold it together, these LEVEL-0 distributors are also referred to as end-plate or holder distributors. These take a single feed stream and distribute it into the one or more passageways that include an inter-module (LEVEL-1) feed distributor; likewise, a corresponding inter-module LEVEL-1 eluent distributor collects the eluent from the one or more passageways that include the eluent inter-module distributors. It is understood that there can be additional distributor levels.

Figure 4:
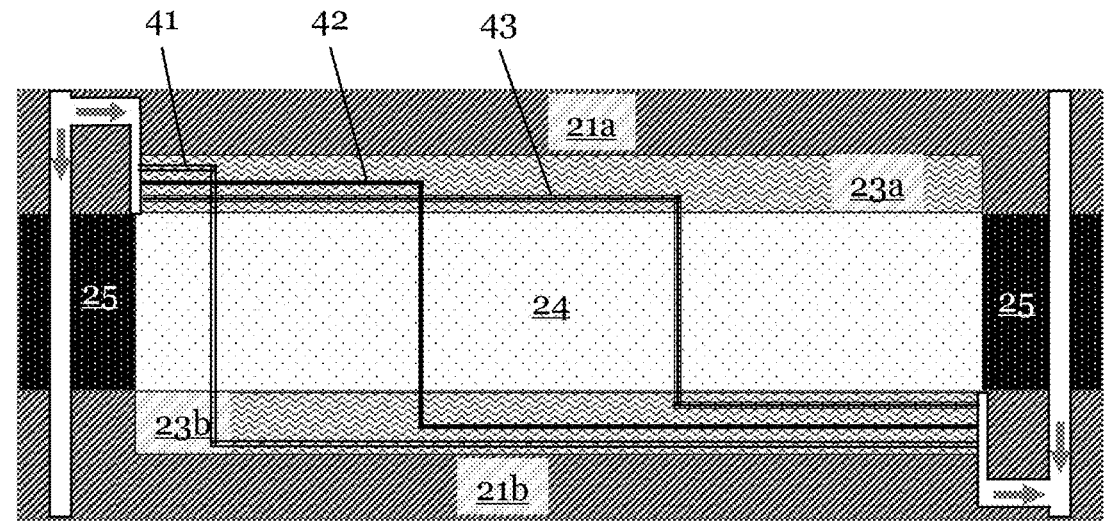
FIG. 4 is a cross-sectional schematic view of the module of FIG. 2A illustrating the geometry and flow configuration of the distributor pairs inducing isomikos flow.

Now referring to FIG. 1, FIG. 2 and FIG. 4, a system 10 includes a feed end plate 12a, having a feed port 13a; a plurality of fluidly connected, substantially similar modules 11a-11n stacked adjacent to the feed end plate 12a and fluidly coupled to the feed port 13a; an eluent end plate 12b having an eluent port 13b, disposed opposite the feed end plate 12a with a plurality of planar, substantially similar modules 11a-11n disposed in between the feed end plate 12a and the eluent end plate 12b; and each one of the plurality of substantially similar modules 11a-11n includes: a chromatographic media bed 24 (FIG. 2) having a first planar surface 26a and a second planar surface 26b (FIG. 2); a distribution network including: an inter-module LEVEL-1 distributor pair 15a and 15b adjacent to the chromatographic media bed, one of the inter-module LEVEL-1 distributor pair 15a having at least one passageway substantially perpendicular to the first and second planar surfaces 26a and 26b and fluidly coupled to the feed port 13a and the other one of the inter-module LEVEL-1 distributor pair 15b having at least one different passageway substantially perpendicular to the first and second planar surfaces 26a and 26b and fluidly coupled to the eluent port 13b; an intermediate LEVEL-2 distributor pair 22a and 22b each one of the pair disposed on opposite sides of the chromatographic media bed, having an array of passageways parallel to the planar surfaces, and fluidly coupled to a corresponding one of the inter-module LEVEL-1 distributor pair 22a and 22b; a planar (LEVEL-3) feed distributor 23a and planar (LEVEL-3) eluent distributor 23b, each one of the planar LEVEL-3 distributor pair 23a and 23b (collectively referred to as planar distributors 23) coupled to respective ones of the intermediate LEVEL-2 distributor pair 22a and 22b and each one of the pair having an array of passageways parallel to the first and second planar surfaces, one of the pair in contact with the first surface of the chromatographic media bed 24 and a second one of the pair in contact with the second surface of the chromatographic media bed 24; and the distribution network includes a plurality of streamline 41 lengths and the plurality of streamline 41 lengths are approximately equal (FIG. 4).

Referring back to FIG. 1, a schematic diagram of system 10 is shown including an array of modules 11a, 11b, 11c . . . 11n (collectively, stacked modules 11) stacked and held together by feed end plate 12a and eluent end plates 12b, respectively. Feed end plate 12a further includes feed port 13a and end plate feed LEVEL-0 feed distributor 14a; eluent end plate 12b further includes eluent port 13b and end plate eluent distributor 14b; distributors 14a and 14b are designated hereafter as the LEVEL-0 distributor set (or pair). Each module 11 includes inter-module feed distributor 15a on a first end of the module and inter-module eluent distributor 15b on the second end of the module, the inter-module distributors aligning to form an inter-module distribution network for the stacked modules 11; these distributors are designated hereinafter as the LEVEL-1 distributor set (or pair). The flow passageways of the inter-module feed distributors 15a further align with the flow passageways of the feed distributor 14a; likewise inter-module eluent distributors 15b further align with the flow passageways of the end plate eluent distributor 14b. The array of modules 11 are sandwiched between feed end plate 12a and eluent end plate 12b. Although eluent port 13b is shown as being on the same side of feed port 13a, it can be located on the opposite side of end-plate 12b. Feed distributor 14a has one or more passageways (not shown) to distribute a single feed stream into a plurality of streams as necessary; likewise, end plate distributor 14b has one or more passageways (not shown) to collect a single eluent stream from a plurality of eluent streams as necessary. The geometrical anti-symmetry (more details on anti-symmetry in the description of FIG. 6A below) in conjunction with the flow configuration (not shown) creates isomikos distributor sets and therefore isomikos flow.

The modules 11 are subject to fluidic pressure forces during operation. Structural elements in the device and array must be sufficient to withstand the mechanical pressure forces. In one embodiment, the tie rods 16 are structural elements which firmly hold together and support the array of modules. In one embodiment, the feed and eluent end plates 12a and 12b are also structural elements via their bending rigidity to withstand pressure forces and axial pressure from the modules. Another embodiment includes structural plates supporting the end plate 12a and end plate 12b which act primarily as structural elements without fluid flow.

Figure 2A:
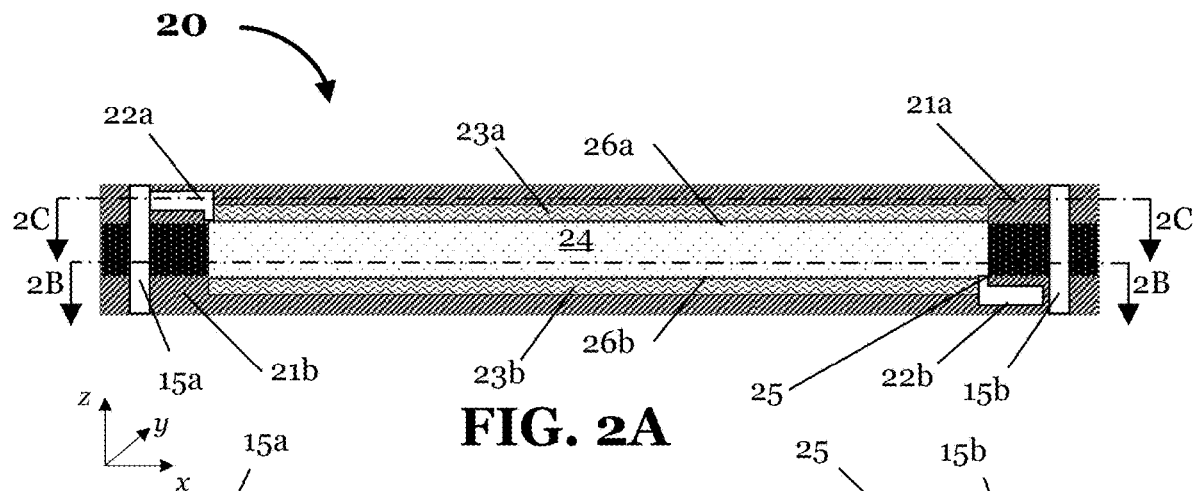
FIG. 2A is a schematic cross section of an exemplary module in the module stack of the exemplary chromatography system of FIG. 1.

FIG. 2A is a cross-sectional schematic view of module 20, sectioned along a z/x-plane cutting through the middle of the module. Module 20 includes chromatographic media bed 24 (also referred to as adsorptive block 24) sandwiched between feed module plate 21a and eluent module plate 21b (referred to commonly as module plates 21). Peripheral seal 25 encases adsorptive block 24 and further adheres feed module plate 21a and eluent module plate 21b forming a sealed adsorptive chamber. Module 20 further includes inter-module distributor 15a (also referred to as inter-module feed distributor 15a on the feed side), intermediate distributor 22a (also referred to as intermediate feed distributor 22a on the feed side) and planar feed distributor 23a (also referred to as planar feed distributor 23a on the feed side or LEVEL-3 distributor) on a first face; and on a second opposite face of module 20 further includes inter-module eluent distributor 15b (also referred to as inter-module eluent distributor 15b on the eluent side), intermediate eluent distributor 22b (also referred to as intermediate eluent distributor 22b on the eluent side) and planar eluent distributor 23b (also referred to as planar eluent distributor 23b on the eluent side). Intermediate feed distributor 22a fluidically connects inter-module feed distributor 15a and planar feed distributor 23a; likewise intermediate eluent distributor 22b fluidically connects inter-module eluent distributor 15b and planar eluent distributor 23b. FIG. 2A further defines the nomenclature used to name the sides of the module: 26a and 26b define respectively the first and second planar surfaces.

It should be further understood that eluent module plate 21b is identical to feed module plate 21a, except that when assembled into module 20 it is rotated 180° about the x-axis and 180° about the z-axis in an anti-symmetrical orientation.

Figure 2B:
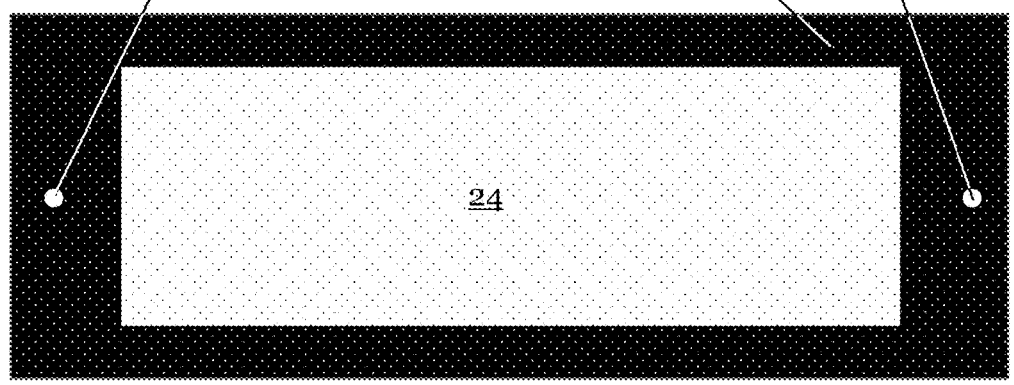
FIG. 2B is a top plan view of the separation device of FIG. 2A.

FIG. 2B is a cross-sectional schematic view of module 20, sectioned along x/y-plane 2B-2B of FIG. 2A. Peripheral seal 25 encases adsorptive block 24, adhering it to peripheral seal 25 and in doing so sealing it fluidically. Inter-module feed distributor 15a and inter-module eluent distributor 15b are embedded in peripheral seal as shown in FIG. 2B.

Figure 2C:
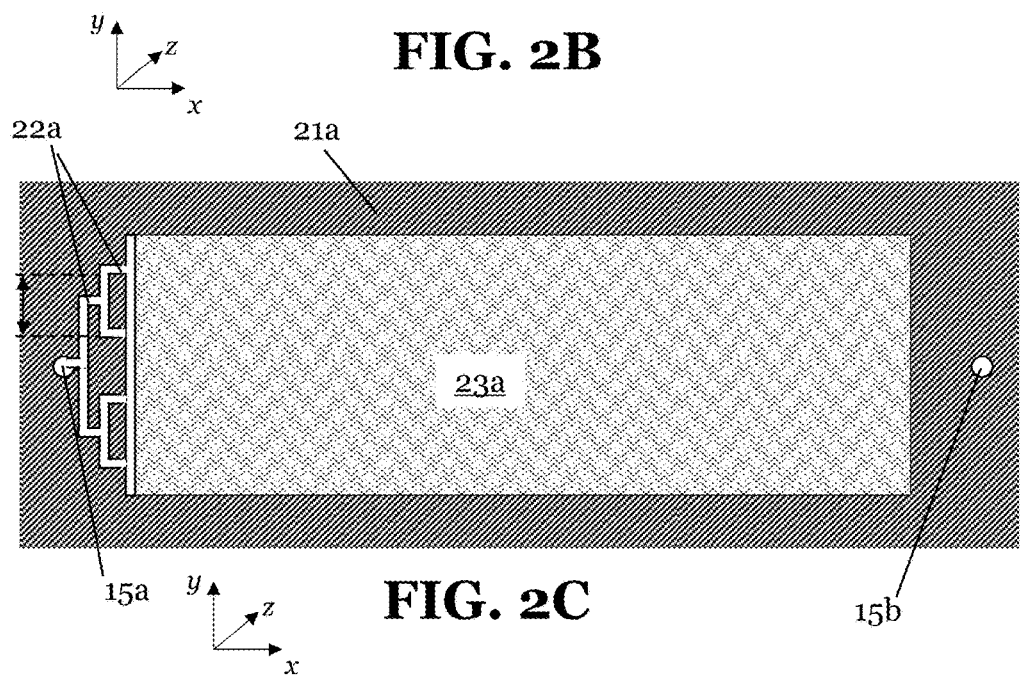
FIG. 2C is a front schematic view of the separation device of FIG. 2A including a feed plate and a planar feed distributor.

FIG. 2C is a front schematic view sectioned along x/y-plane 2C-2C of FIG. 2A of feed module plate 21a, showing planar feed distributor 23a, inter-module feed distributor 15a and eluent distributor 15b, respectively, and intermediate feed distributor 22a. Intermediate feed distributor 22a includes a two-level, branched isoflo distributor.

Referring to FIGS. 2A, 2B and 2C, the inter-module distributors 15 are substantially one-dimensional, cylindrical passageways along the z-axis, that distribute the fluid at discrete points along the z-axis. In some embodiments the cross-sections of the passageways are circular; in others the cross-section is other than circular. In some embodiments the cross-section remains constant along the z-axis; in other embodiments the cross-section decreases along the flow direction. In contrast, referring again to FIGS. 2A-2C, the planar distributors 23 are two-dimensional distributors that distribute the fluid continuously along the x-axis from their start to their end. In some embodiments the planar distributors 23 include thin, shallow rectangular channels having the same cross-section along the x-axis from the first end to the second end; in other embodiments these channels do not have a rectangular cross-section, but instead are trapezoidal, or triangular, or are a section of a circle, or are combinations thereof; in still other embodiments the cross-section diminishes along the x-axis linearly, in some embodiments the decrease is such that the cross-section is almost zero at the second end. In still other embodiments the planar distributors 23 include woven or non-woven spacers of constant thickness instead of channels; in some embodiments the thickness of the spacers diminishes along the x-axis; in still other embodiments the thickness of the spacers remains constant but the porosity, the cross-section for flow, diminishes along the x-axis. In still other embodiments the planar distributors 23 include a combination of channels and spacers. When the cross-section for flow diminishes along the x-axis these are referred to as converging channels or spacers.

Referring again to FIG. 2C, the intermediate distributors 22 in one plane are one-dimensional, starting from a point source and distributing fluid along the y-axis through a series of passageways that extend along the x/y-plane ultimately ending in a channel oriented along the y-axis. In the embodiment shown in FIG. 2C, a two-level branched isoflo distributor delivers both isomikos and isochronous flow. In some embodiments these have only one branching level; in still other embodiments the three or more branching levels are used determined by the design spacing between the branches 27. In some embodiments the spacing is less than 2 cm, in other embodiments less than 1 cm and in still other embodiments less than 0.5 cm. The smaller the spacing the better the distribution but in some embodiments more branching levels used which in turn requires a larger distance along the x-axis to accommodate the branches. In some embodiments passageways that do not include an isoflo branching are used; in still other embodiments instead of passageways a planar diffuser with suitable ribs and/or stubs is used.

Figure 3:
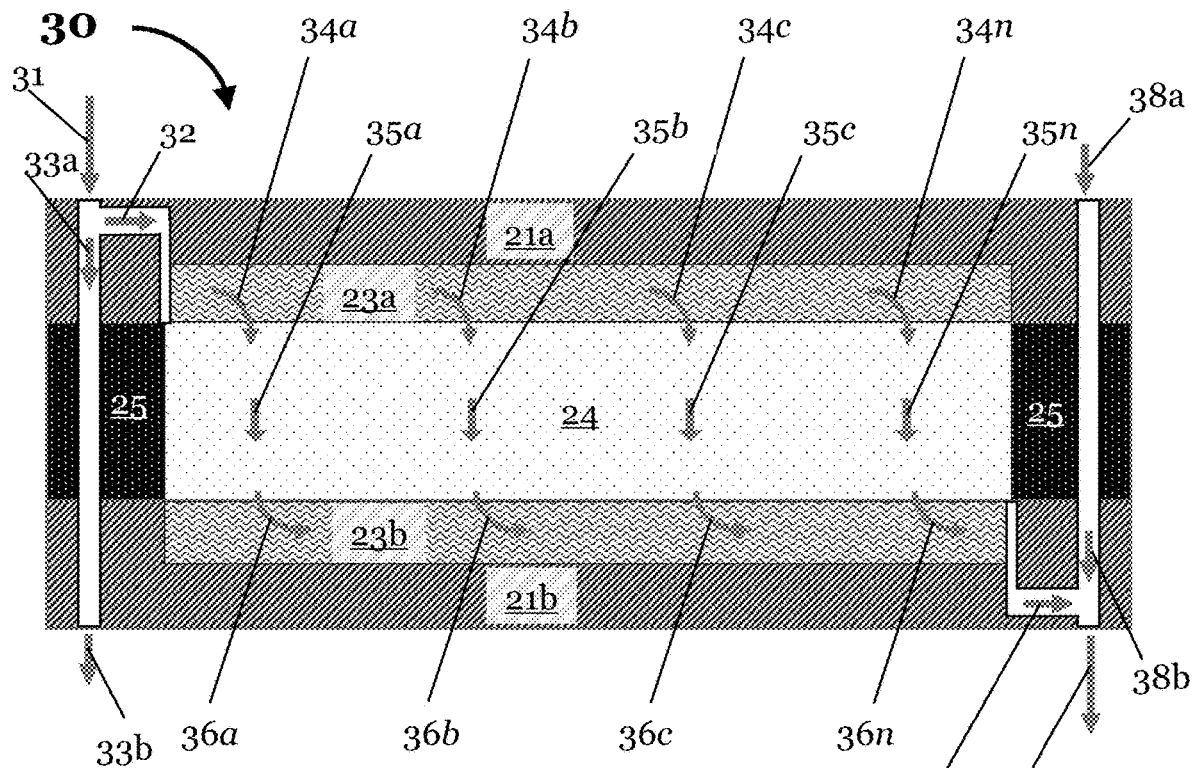
FIG. 3 is a cross-sectional schematic view of module of FIG. 2A, sectioned along a z/x-plane illustrating the flow configuration into and out of the module.

FIG. 3 is a cross-sectional schematic view of module 30, sectioned along a z/x-plane cutting through the middle of the module as in FIG. 2A, illustrating the flow configuration into and out of the module while in use. Module 30 is identical to module 20 of FIG. 2A, except that its thickness is stretched to illustrate more clearly the flow details, the arrows representing the flow streams. It should be understood that module 30 is part of an array of stacked modules, with one identical module (having first and second module plates) stacked above and another stacked below it. Feed stream 31 from the previous module enters module 30 into the inter-module feed distributor, splitting into stream 32, which enters the intermediate feed distributor and stream 33a continuing to the next module, shown as stream 33b exiting from module 30. Stream 32 is distributed into planar feed distributor 23a and further redirected into a plurality of streams 34a, 34b . . . 34n perpendicular to the planar feed distributor 23a (collectively, streams 34), to become the mobile phase flowing through the adsorptive block 24 in the form of streams 35a, 35b . . . 35n (collectively, streams 35). Streams 35 are collected into planar eluent distributor 23b after turning 90° as streams 36a, 36b, . . . 36m (collectively, streams 36). Stream 37, the combined effluent from planar eluent distributor 23b, is further collected by intermediate eluent distributor and combined into eluent stream 38b (from the module stacked above module 30) within the inter-module eluent distributor forming combined eluent stream 39. Combined eluent stream 39 continues to the next module stacked below module 30, similarly to eluent stream 38a entering inter-module eluent distributor from above. It should be understood that "above" and "below" are terms used to conveniently describe the stacking of modules but do not limit the orientation of the stack; the stack can be oriented sideways instead of vertically, or in any other spatial orientation.

It is noted in one embodiment, that the distribution network within a module includes a set of at least three distributor pairs (i.e., LEVEL-1, LEVEL-2 and LEVEL-3) each pair being opposed anti-symmetrically to the corresponding pair with the fluid flowing iso-directionally in each corresponding distributor pair. This configuration is described below in more detail with reference to FIG. 6A.

In the case of a stack, a fourth distributor pair is required, a LEVEL-0 distributor pair, within or adjacent to the module plates. This geometrical and flow configuration enables isomikos flow where streamlines through module 30 have approximately the same length as shown next in FIG. 4.

FIG. 4 illustrates schematically how the geometry and flow configuration of the distributor pairs induce isomikos flow. A plurality of streamlines exists within module 40 (also referred to as adsorptive block 40), of which three are illustrated in FIG. 4. Streamline 41 follows a short path within planar feed distributor 23a, then turns 90° into adsorptive block 40, followed by another 90° turn within planar eluent distributor 23b. It is noted that while the path length of streamline 41 in planar eluent distributor 23b is longer than that in planar feed distributor 23a, the combined length of the two equals the length of the planar distributors. Likewise, streamlines 42 and 43 follow similar trajectories as streamline 41, except that the 90° turn into the adsorptive block occurs at a different x-coordinate within the planar feed distributor, turning again 90° at a correspondingly different x-coordinate within the planar eluent distributor. It is noted that the length of each of streamlines 41, 42 and 43 is the same notwithstanding the different points at which they turn 90° into the adsorptive block.

To summarize, the criteria that induce the desired outcome of isomikos flow are:
(a) identical distributor pairs opposed to each other anti-symmetrically, and
(b) iso-directional flow in linear distributors.

It is noted, that these criteria also ensure isomikos flow in a stack of modules.

Isochronous Distributor Pairs

As stated earlier, the functional criteria for high resolution in a module and system is a uniform RTD. While in theory it is possible to obtain a uniform RTD without isomikos flow, in practice it is difficult to do so. Therefore, the devices and systems described herein are designed to have isomikos flow (i.e., a geometrical configuration that results in all streamlines having approximately the same length). Once isomikos flow is achieved, another condition is necessary (and sufficient) to obtain a uniform RTD, namely, that the velocity remain approximately constant at each corresponding segment in every streamline, which means in every segment of the flow path, or in each distributor pair. Distributors which enable each segment of a streamline to have both the same length and the same velocity result in all streamlines taking the same time to traverse from inlet to outlet. Such distributors are referred to herein as isochronous distributors. The importance of this criterion is described below in conjunction with FIGS. 5A-10.

Figure 5A:
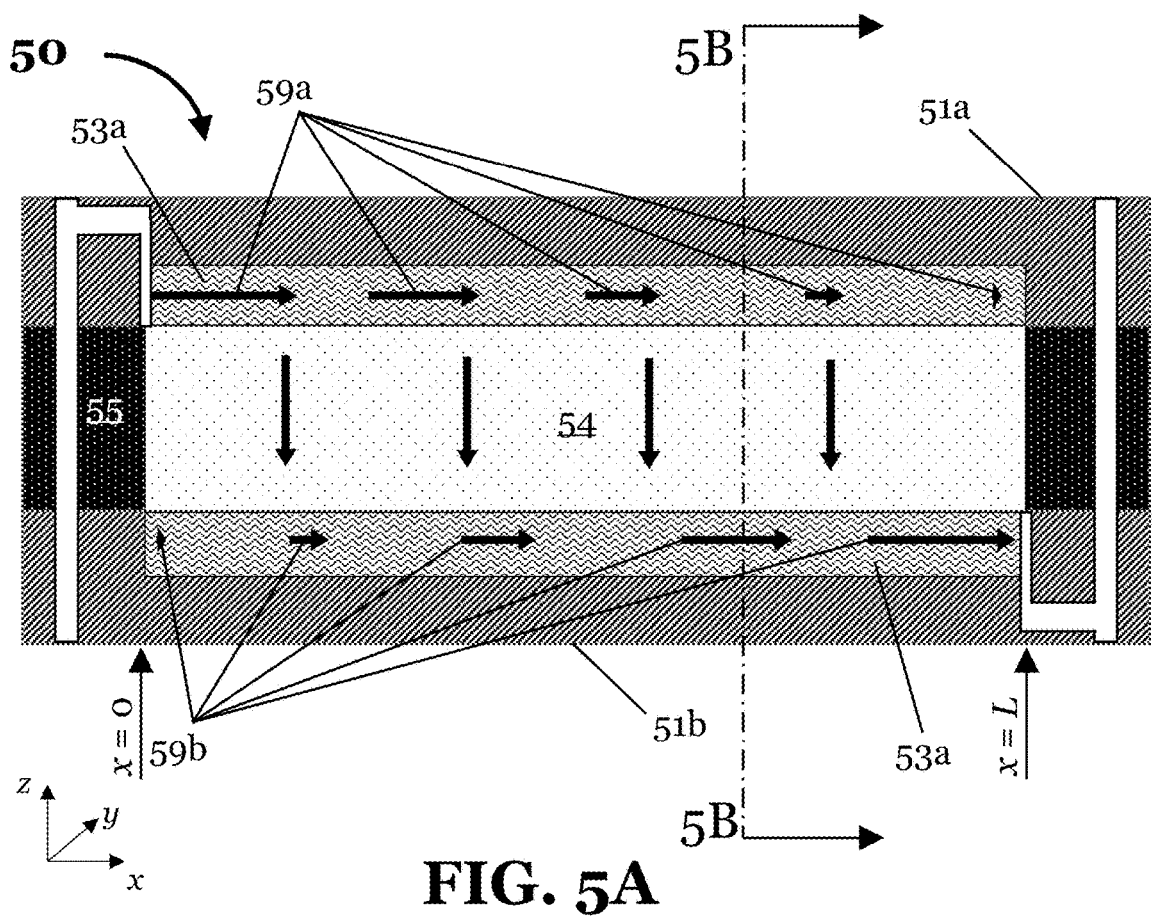
FIG. 5A is a cross-sectional schematic view of a module similar to the module of FIG. 4, illustrating planar distributors integrated into the feed and eluent module plates.

FIG. 5A is a schematic diagram of module 50, similar to module 40 of FIG. 4, having adsorptive bed 54 encapsulated with peripheral seal 55, planar feed distributor 51a, Planar eluent distributor 51b, each module plate comprising planar distributors 53a and 53 b, respectively. In this embodiment, planar feed distributor 51a and planar eluent distributor 51b are integrated into the module plates, as molded, cast, or machined plates. Planar distributor 53a includes an array of rectangular channels along the x-axis having constant depth and width, yielding a velocity distribution represented by arrows 59a and 59b in planar feed distributors 51a and planar eluent distributor 51b, respectively. Distributors having a constant cross-section are hereafter referred to as simple distributors. As shown, since the feed stream in Planar distributor velocity distribution represented by arrow 59a is distributed uniformly into adsorptive bed 54, the flow rate is diminishing while the cross-sectional area of the distributor remains constant, with the result that the velocity, arrow 59a, gradually diminishes, with the highest velocity occurring at x=0 reaching a value of zero at the end of the distributor, at x=L. Likewise, the eluent stream is gradually collected in planar eluent distributor 51b, resulting in the velocity increasing from zero at the start of the planar eluent distributor 51b (x=0) to the maximum at its end (x=L). As shown in FIG. 4, distributors 59 induce isomikos flow, but as should be self-evident from FIG. 5A, they do not induce isochronous flow. Consider the streamline at x=0: the fluid collected on planar eluent distributor 51b has a zero velocity, therefore, the time that it takes to leave that point is theoretically infinite; the same occurs at the streamline at x=L, except now the zero fluid velocity occurs at the end of the feed distributor 50a.

Figure 5B:
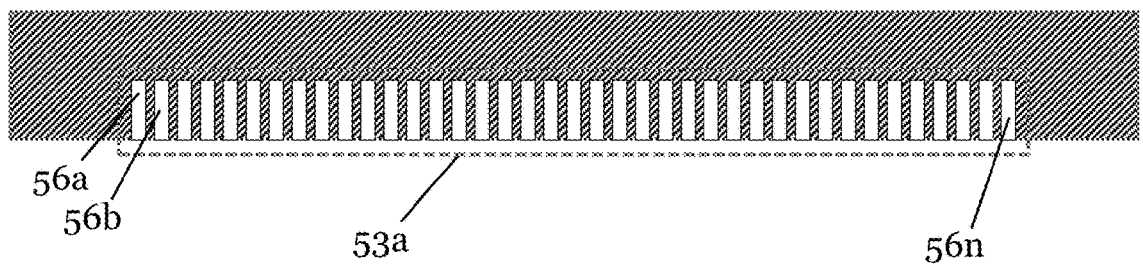
FIG. 5B is a cross-sectional view of a planar distributor taken along section 5B-5B of FIG. 5A.

FIG. 5B is a schematic diagram of the cross-section of planar feed distributor 51a along the y/z-plane at 5B-5B on FIG. 5A. Planar distributor 53a, represented by dashed lines, includes an array of identical rectangular channels 56a, 56b, ... 56n (collectively, channels 56). As shown in FIG. 56B, planar distributor 53a is integrated into planar feed distributor 51a by fabrication methods such a molding, casting, machining, or 3D-printing.

Figure 6A:
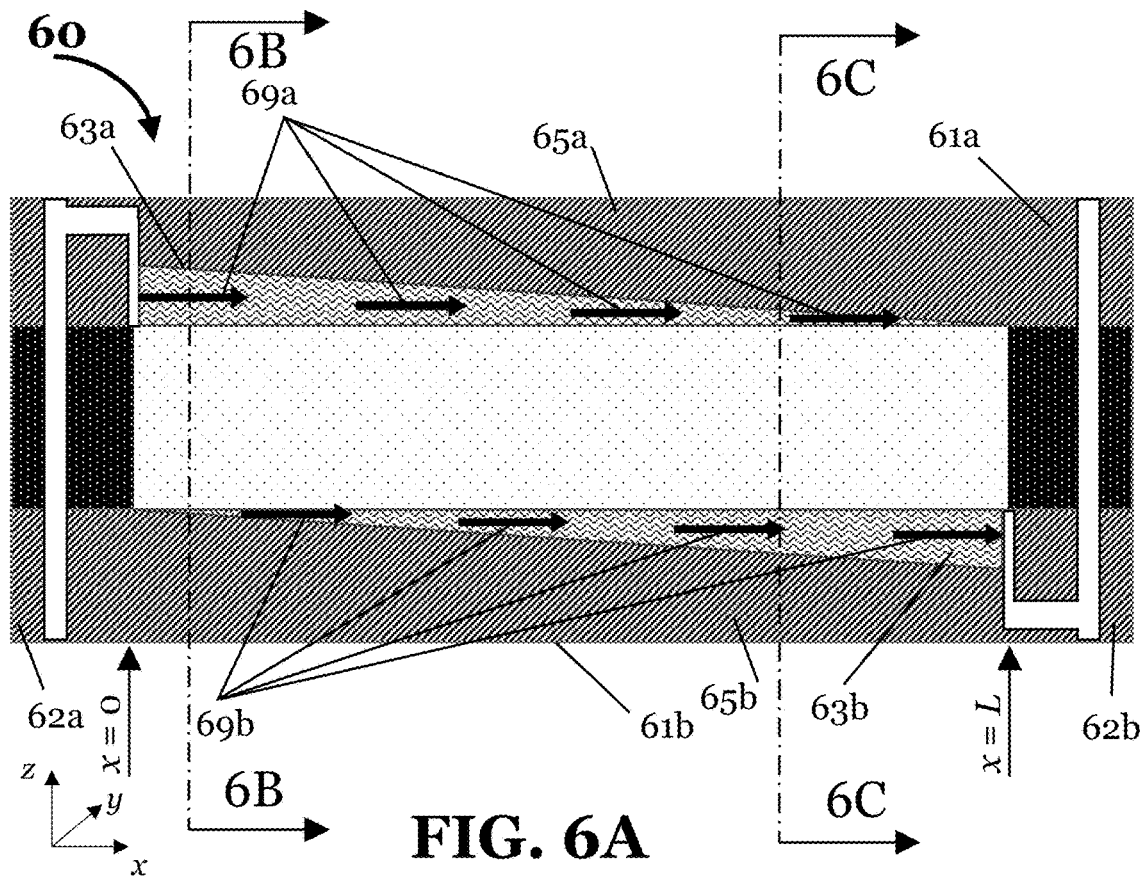
FIG. 6A is a schematic diagram of a module having a converging flow distributor according to embodiments of the invention disclosed herein.

FIG. 6A is a schematic diagram of a module having a converging flow distributor. Module 60 of FIG. 6A is similar to module 50 of FIG. 5A except that instead of having simple planar distributors it has convergent feed planar distributor 63a and convergent eluent planar distributor 63b on the feed and eluent sides, respectively. Converging feed distributor 63a is characterized by having a cross-sectional area for flow that diminishes approximately linearly from the start at x=0 to the end at x=L; conversely, the converging eluent planar distributor is characterized by having a cross-sectional area for flow that increases approximately linearly from the start at x=0 to the end at x=L. In these convergent planar distributors, the fluid velocity in the feed and eluent distributors 63a and 63b remain approximately constant along their lengths as represented flow arrows 69a and 69b, respectively. This characteristic results in streamlines having the same residence time and approximately the same lengths (i.e., such convergent distributor pairs are both isomikos and isochronous pairs, and deliver isochronous flow).

Referring again to FIG. 6A, module 60 is a rectangular solid with first end 62a and second end 62b opposite first end 62a, a first face (or planar surface) 65a and a second face 65b opposite first face 65a, and a first side (the z/x-plane coming out of the page) and a second side (the z/x-plane going into the page) opposite the first side. The location and orientation of the second distributor of a distributor pair is that given by rotating the first distributor 180° about the y-axis (an axis perpendicular to the sides of module 60) and locating it in the opposite end or opposite face. Thus, the first distributor is disposed anti-symmetrically to the second distributor.

Figure 6B:
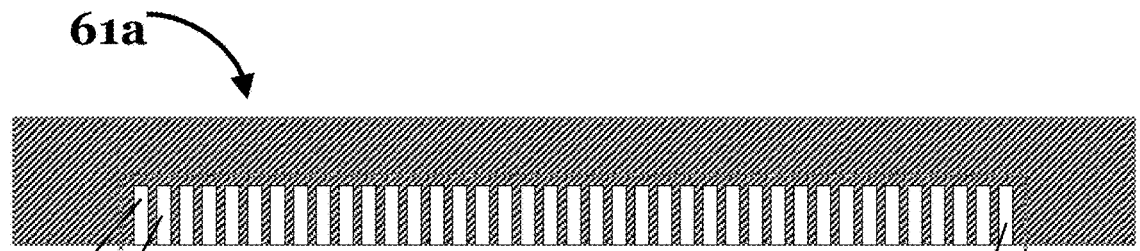
FIG. 6B is a cross-sectional view of a converging distributor taken along section 6B-6B of FIG. 6A.
Figure 6C:
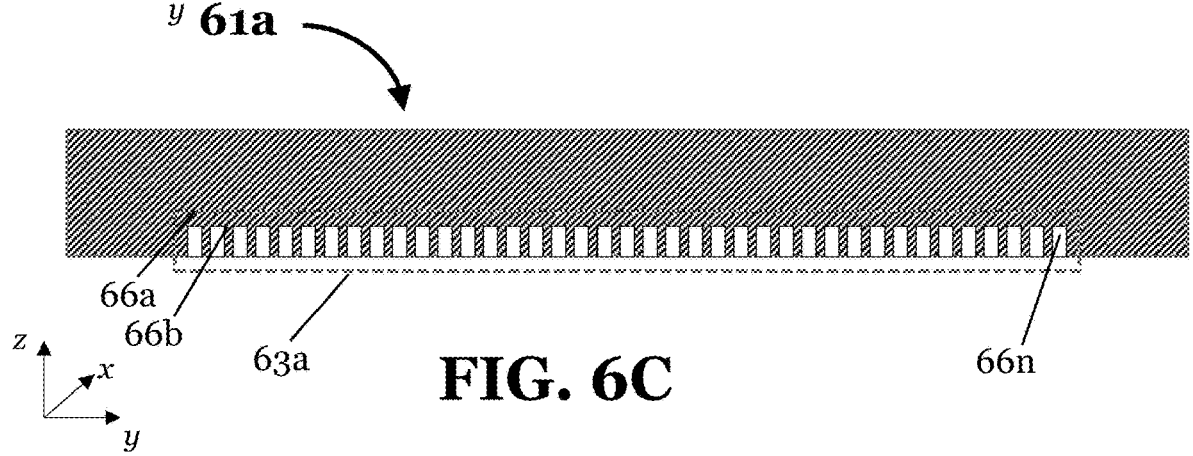
FIG. 6C is a cross-sectional view of a converging distributor taken along section 6C.6C of FIG. 6A.

FIGS. 6B and 6C are schematic diagrams of the cross-section of isochronous converging planar distributor 61a, FIG. 6B being the cross-section at x/y-plane cut 6B.6B of FIG. 6A, in contrast to FIG. 6C which show the cross-section at cut 6C.6C of FIG. 6A. In this embodiment the planar distributor is an array of parallel rectangular channels 66a, 66b ... 66n (collectively, channels 66), having the same width but a diminishing depth along axis-x as shown in FIG. 6C.

In some embodiments the planar distributor pairs are simple distributors delivering isomikos flow. In other embodiments the planar distributor pairs are converging distributors delivering isochronous flow. Embodiments having simple distributors include an array of parallel channels having a rectangular cross-section as shown in FIG. 5B. In some embodiments the cross-section of the channels is trapezoidal or triangular, thereby providing the advantage that the ribs defining the channel are stiffer. In other embodiments simple planar distributors include woven screens; in still other embodiments these include non-woven screens, of which there are many types known to those skilled in the art. In still other embodiments simple planar distributors include a two-dimensional array of studs. In still other embodiments planar distributors include a combination of channels or studs and screens, woven or non-woven. The key attribute of a simple planar distributor being that the cross-sectional area for flow is approximately equal along the x-axis. As already mentioned, simple planar distributors are added as inserts to wells in the module plates forming the module, or planar distributors are molded, cast, machined or 3D-printed such that the planar distributors are integrated into the module plates.

Embodiments having converging planar distributor pairs are characterized by distributors having a cross-section for flow that changes approximately linearly along their length, the x-axis, "ideally" converging to a cross-section for flow having zero open area. The term "ideally" as used herein describes the difference between theory and experiment, because in practice a gradual and reliable change towards zero in an open area is not possible. Therefore, converging distributors, disclosed herein, try to approach the ideal converging distributor, with the approach to ideality being measured by their degree of convergence (hereafter "convergence") defined as the fractional reduction in the open area from one end to the other one, $$\text{Convergence} \equiv 1 - \frac{\text{Open area at small end}}{\text{open area at large end}} \quad (1)$$

In some embodiments convergent distributors have a convergence of at least 70%, in other embodiments of at least 80%, in still other embodiments at least 90% and in still other embodiments at least 95%. The converging distributors of embodiment disclosed herein are very different from those disclosed in the prior art, since objective of the converging distributors disclosed herein is not to accelerate the flow, but to keep the velocity constant (i.e., zero acceleration).

Figure 7A:
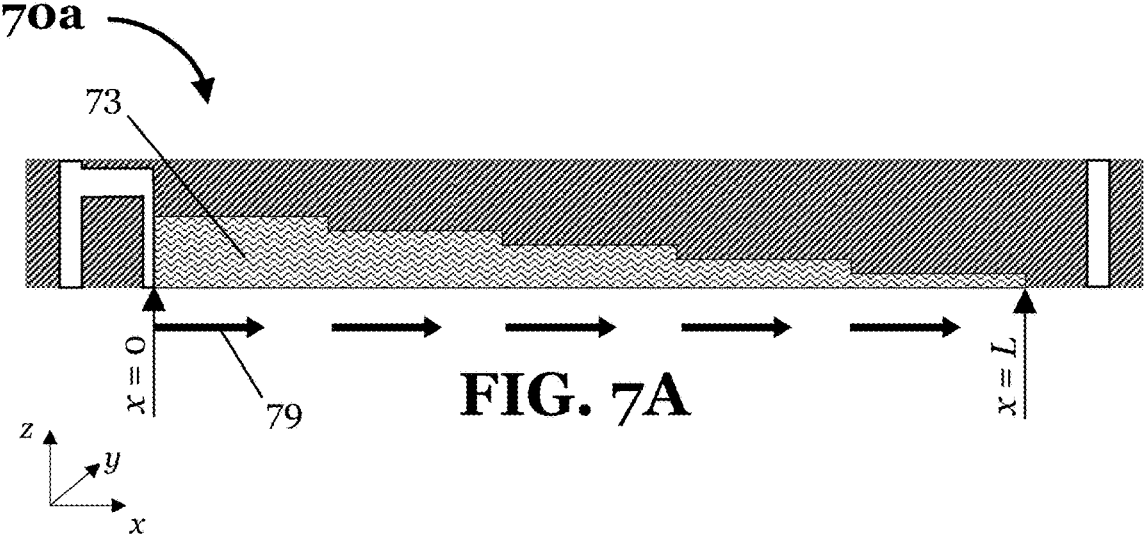
FIG. 7A is a schematic diagram of convergent planar distributors having discrete or step changes in the cross-sectional area of the distributor according to embodiments of the invention disclosed herein.
Figure 7B:
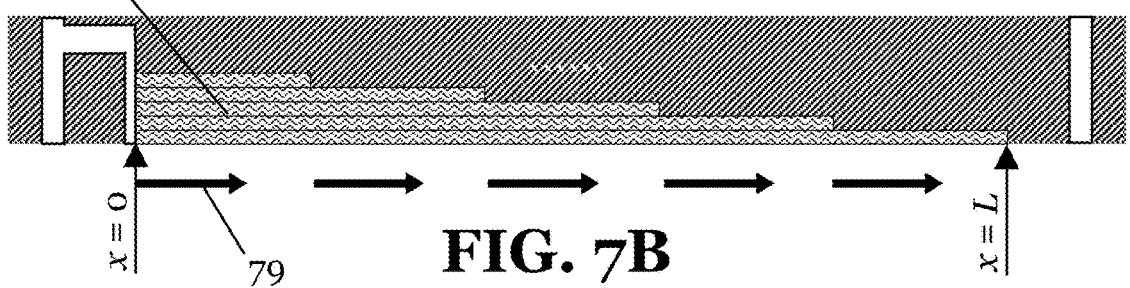
FIG. 7B is a schematic diagram of a discrete converging distributor, including spacers or screens of the same thickness but varying lengths stacked on top of each other to fill the discrete distributor wells according to embodiments of the invention disclosed herein.

In some embodiments convergent planar distributors include discrete or step changes in the cross-sectional area of the distributor as shown in FIGS. 7A and 7B. Feed module plate 70*a* includes convergent feed planar distributor 73 further comprising a parallel array of channels having a rectangular cross-section. The channels form five distinct segments, each segment having a channel height, h, smaller than the channels in the previous segment. The channel heights decrease linearly according to the formula, $$h_i = h_1 \cdot [1 - 0.2 \cdot (i-1)]; \quad (2)$$

where i=1, 2, . . . 5 denoting each of the five segments.

In another embodiment, convergent feed planar distributor 73 of FIG. 7A includes spacers or screens of different thicknesses instead of channels, their thickness varying according to equation (2) above. Module plate 70*a* includes wells that can accept the five discrete spacers. Arrow 79 indicates flow direction.

FIG. 7B shows another embodiment of a discrete converging distributor, where converging distributor 75 includes spacers or screens of the same thickness but varying lengths stacked on top of each other to fill the five discrete distributor wells in module plate 70*b*. Arrow 79 indicates flow direction.

In some embodiments a converging distributor has the same height along its length but further include a spacer or screen having a varying open area along the length of the distributor. Such a spacer can be fabricated using 3D-printing. In some embodiments multiple spacers or screens having the same thickness but different open areas are arranged sequentially to form the converging distributor, where the spacers are placed in order of decreasing open area.

Figure 8:
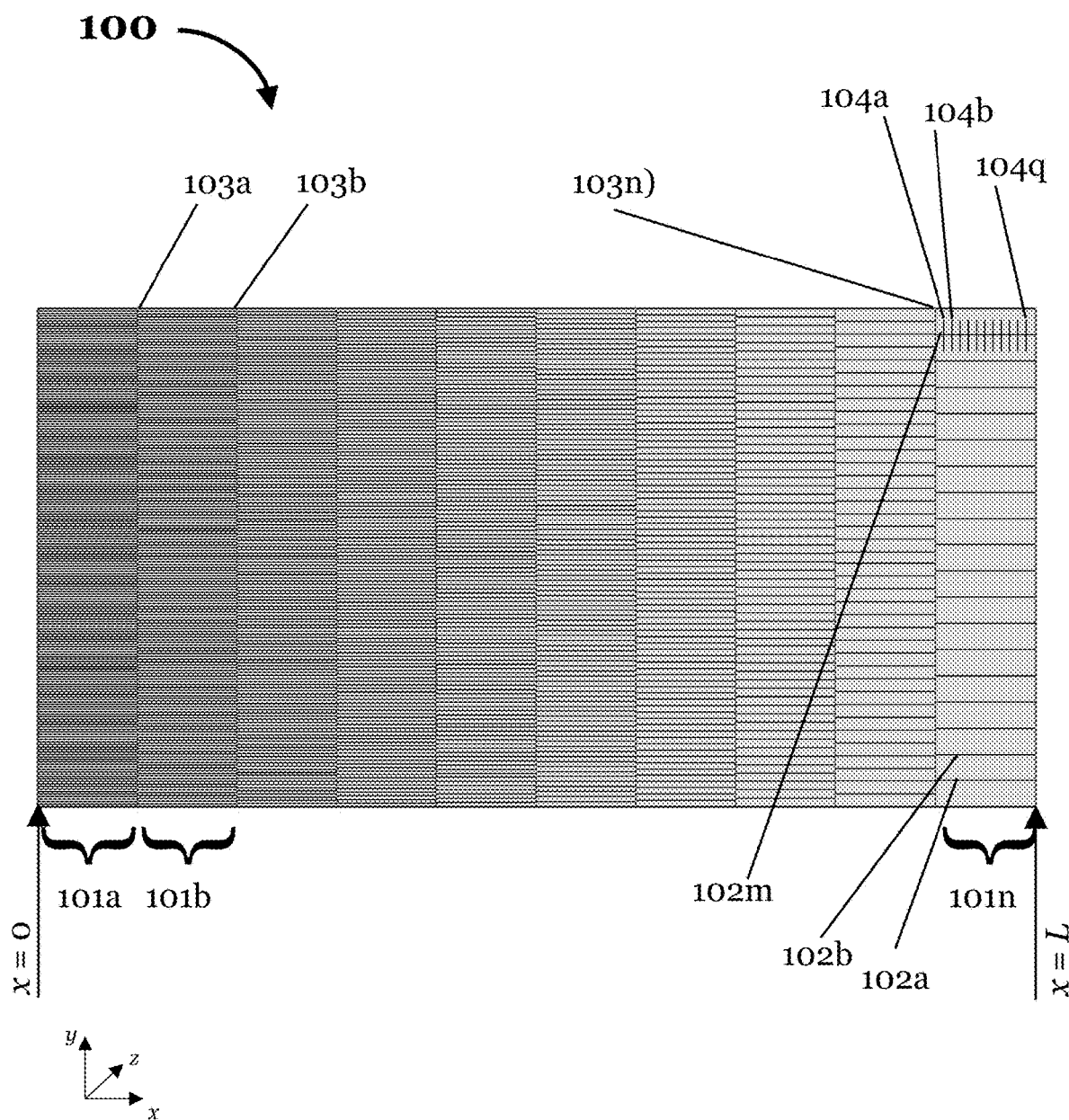
FIG. 8 is a schematic top view of a converging distributor comprising multiple sequential arrays according to embodiments of the invention disclosed herein.

FIG. 8 is a schematic front view of a converging distributor comprising multiple sequential arrays 101*a*, 101*b* . . . 101*n* (collectively, arrays 101), in this case, ten arrays. Arrays 101 include rectangular channels 102*a*, 102*b*, . . . 102*n* (collectively, channels 102) oriented along the x-axis to distribute the feed stream (or collect the eluent stream). In this embodiment, channels 102 are identical in cross-section to other channels 102 in each array. To obtain a linear convergence, the number of channels 102 in each array decreases linearly according to the formula, $$N_i = N_1 \cdot [1 - 0.1 \cdot (i-1)]; \quad (3)$$

where i=1, 2, . . . 10 denoting each of the ten arrays.

Lateral distribution channels 103*a*, 103*b*, . . . 103*n* (collectively, channels 103) are perpendicular to channels 102 and distribute the effluent from each array 101 to the inlet of the subsequent array 101. Optionally, lateral distribution channels 104*a*, 104*b*, . . . 104*q* (collectively, lateral distribution channels 104) are added to each channel 102 in each array to improve distribution along the y-axis as the channels in that array become more distant from each other. It should be understood that lateral distribution channels 104 would be added to every channel 102 in the array that calls for having lateral distribution channels 104 (not shown in FIG. 8).

In some embodiments converging distributors as the one shown in FIG. 8 have channels with width and height of that vary from array 101 to each subsequent array 101. The general formula for the design of such "discrete" converging distributors is that the open area, $A_i$, in each segment is given by Equation (4), $$A_i = A_1 \cdot [1 - (1/n) \cdot (i-1)]; \quad (4)$$

where i=1, 2, . . . n denoting each of the n segments or arrays.

The combination of number of channels 102 in each array and their width and height is such that the open area of each segment or array follows Equation (4).

Planar isoflo distributor pairs deliver isochronous flow. By design, isoflo distributors, whether one or two-dimensional (described below in further detail regarding the intermediate LEVEL-2 distributor) deliver both isomikos and isochronous flow by virtue of flow paths being approximately identical to each other (i.e., every streamline has the same length, isomikos flow as well as the same velocity at every corresponding point in each streamline) thereby resulting in isochronous flow. In certain embodiments, planar distributors include a y-conduit to distribute the flow from intermediate distributors comprising discrete conduits.

Now referring to the intermediate LEVEL-2 distributor, in certain embodiments, these LEVEL-2 distributors are branched distributors that take the fluid from a point source and distribute it along the y-axis to feed a simple or converging planar distributor. When branched distributors are used, whether or not they are isoflo distributors, the intermediate distributors typically include a passageway that connects the inter-module distributor to the planar distributor. These y-conduits in other embodiments are converging channels to maintain a constant velocity in those y-conduits as the liquid is distributed or collected. In still other embodiments branched distributors are a planar diffuser having a triangular geometry, the cusp of the triangular diffuser serving as the point that connects the inter-module distributor to the intermediate distributor.

Adjustment of HR in Modular Chromatography

As described above, good chromatographic performance of an array of parallel modules requires that the HR of each module be substantially similar to obtain an isoflo array. There are various reasons why substantially similar modules do not exhibit the same HR despite having been fabricated with the same materials and with the same process. In the case of web-based devices, the membrane/web-making process has inherent variations that result in variations in the HR of each membrane layer; also, the process to fabricate the web-based module generates variations in the compression of each membrane/web stack within a module. In the case of bead-based devices, there are inherent variations in the particle size distribution of the beads used to pack the device, and variations in the process of packing the beads into the device, all of which result in variations in the HR of a device. In the case of monolithic media devices, there are inherent variations in the process of making the monolith, all of which result in variations in the HR of a device.

The HR of a module is defined as the pressure drop across the module, $\Delta P_M$, divided by the liquid velocity within the bed, hereafter the bed velocity, $V_B$, according to Equation (5), $$HR \equiv \frac{\Delta P_M}{V_B} = \frac{\Delta P_M}{Q} S \qquad (5)$$

where Q is the liquid flow rate into the module and S is the cross-sectional area of the bed. The unit used hereafter for the HR is psi/(cm/min), abbreviated as "pcm."

A way of measuring the variation in HR in an array of modules calculating the coefficient of variation, CV, is defined in Equation 6 as:

$$CV = \frac{SD_{[HR]}}{AVG_{[HR]}} \qquad (6)$$

where $SD_{[HR]}$ is the standard deviation of the modules comprising an array, and $AVG_{[HR]}$ is average HR of those same modules. It is noted, that CV is dimensionless, typically expressed as a percentage. The values of CV can range from 0% to 100%, and possibly higher; however, to obtain an array that performs chromatographically similarly to the modules comprising the array the CV should be less than 50%, and preferably lower, optimally closer to 0%.

Therefore, there is a need to adjust the HR of a module after it is manufactured to a desired value. There is a further need for a method to adjust the HR accurately and controllably, such that modules comprising an array can be adjusted to have an HR very close to each other even when their original HR is not as close. An HR-adjusting method should:
- be accurate and controllable, such that an array of modules can be adjusted to have an HR very close to each other;
- result in a stable HR once it is adjusted;
- be reliable and reproducible, such that it can be practiced from batch to batch; and
- not introduce contaminants.

Since each module comprising a single array is of the same design and fabricated by the same process, it is expected that the inherent variation of the HR of the modules is not large, and therefore, that the adjustment in HR is a fraction of the average HR of the modules. In some embodiments the HR adjustment is less than 50%; in other embodiments the HR adjustment is less than 20%; in other embodiments the HR adjustment is less than 10%; in still other embodiments the HR adjustment is less than 5%.

An objective is to achieve an isoflo array, which means that the HR of all modules is substantially the same. The phrase "substantially the same HR" as used herein means that the coefficient of variation of the HR of the modules including the array is less than about 20% in one embodiment, in other embodiments less than about 10%, in still other embodiments less than about 5% and in still other embodiments less than about 2.5%. The lower the coefficient of variation the closer the chromatographic performance of the array is to the average of the chromatographic performance of each individual module.

Controlled Plugging

In some embodiments the HR adjustment is achieved by the controlled plugging of the porous (adsorptive) media by means of a particulate dispersion. As used herein, a particulate dispersion (hereafter, dispersion) is a liquid solution that contains suspended particles dispersed such that substantially all the particles are dispersed fully (i.e., the particles are not attached to other particles or clumped together). It is desirable for particulate dispersions to be stable, such that the suspended particles remain fully dispersed over time even if they settle due to gravity.

In embodiments disclosed herein, once a module is fabricated and its HR measured, a dilute dispersion that plugs the media packed within the module is pumped into the module at a controlled flow rate to plug the module in a very gradual manner; the operator doing the plugging continuously monitors the HR of the module until the module reaches the target HR, at which point the operator stops the injection of the plugging solution into the module. In doing this, the operator controls the end-point, hence, "controlled plugging."

Figure 9:
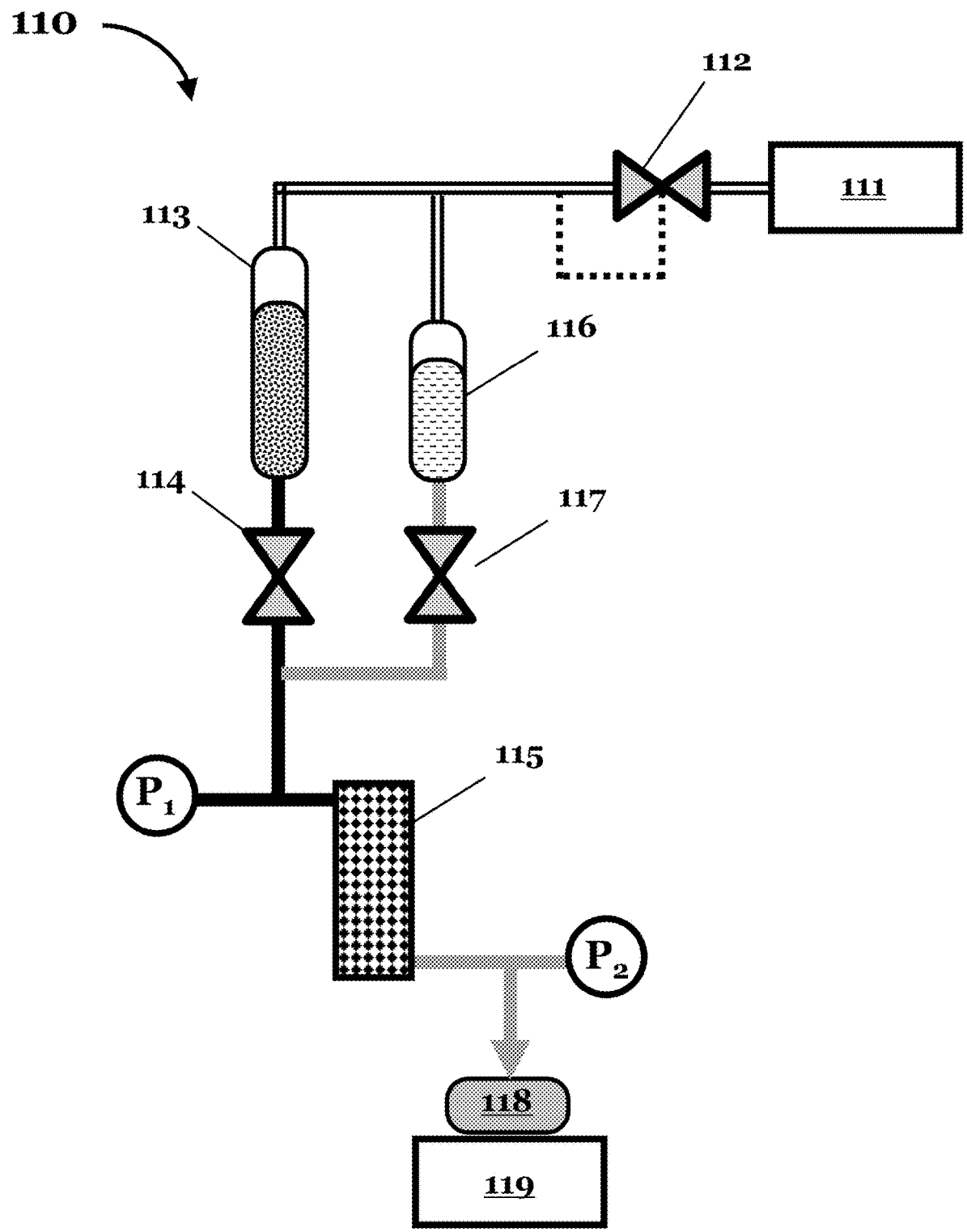
FIG. 9 is a piping and instrumentation diagram (P&ID) of controlled plugging system 110 using compressed air to inject a dispersion of microparticulate solids into a module, according to embodiments of the invention disclosed herein.

FIG. 9 is a P&ID of controlled plugging system 110 using compressed air 111 to inject a dispersion into a module. Compressed air is used to pressurize dispersion reservoir 113, which is injected to module 115 through dispersion valve 114. The module feed and effluent pressures, P1 and P2, respectively, are measured during the injection of the dispersion, as well as the mass of the effluent 118 by means of balance 119. The HR of module 115 is continuously calculated to enable an operator to stop flowing of the dispersion when the module HR reaches the target, at which point the operator shuts off dispersion valve 114. The HR of module 115 can be checked by flowing a diluent having no dispersion contained in pressurized reservoir 116 through diluent valve 117.

In some embodiments the dispersion is adsorptive medium. In other embodiments a layer of a plugging medium is added on top of the adsorptive media to affect the plugging. The "plugging layer" can be a filtration web or a microporous membrane filter, and the plugging dispersion is tailored to plug the match the plugging layer such that it can be plugged in a controlled manner. The effective pore size of the plugging layer can be larger or lower than that of the adsorptive media. In some embodiments the plugging layer has pores smaller than the adsorptive media, (e.g., 0.2~1 µm and 1~4 µm, respectively). In other embodiments the plugging layer has pores larger than the adsorptive media. A benefit from having smaller pores in the plugging layer is that it prevents the plugging particles from reaching the adsorptive media.

Embodiments disclosed herein can also be practiced with conventional chromatography columns packed with chromatographic beads. Conventional columns have one or more frits that retain the chromatographic beads. To retain the beads the pores of the frits are smaller than the diameter of the chromatographic beads. Therefore, in these embodiments the plugging layer is naturally the frit or the bead retainer.

One advantage of having a dedicated plugging layer is that the same plugging system, plugging dispersion and plugging layer, can be used for any adsorptive medium even if these have different pores sizes. Therefore, once the plugging system is developed and characterized, the system can be applied "across the board."

Figure 10A:
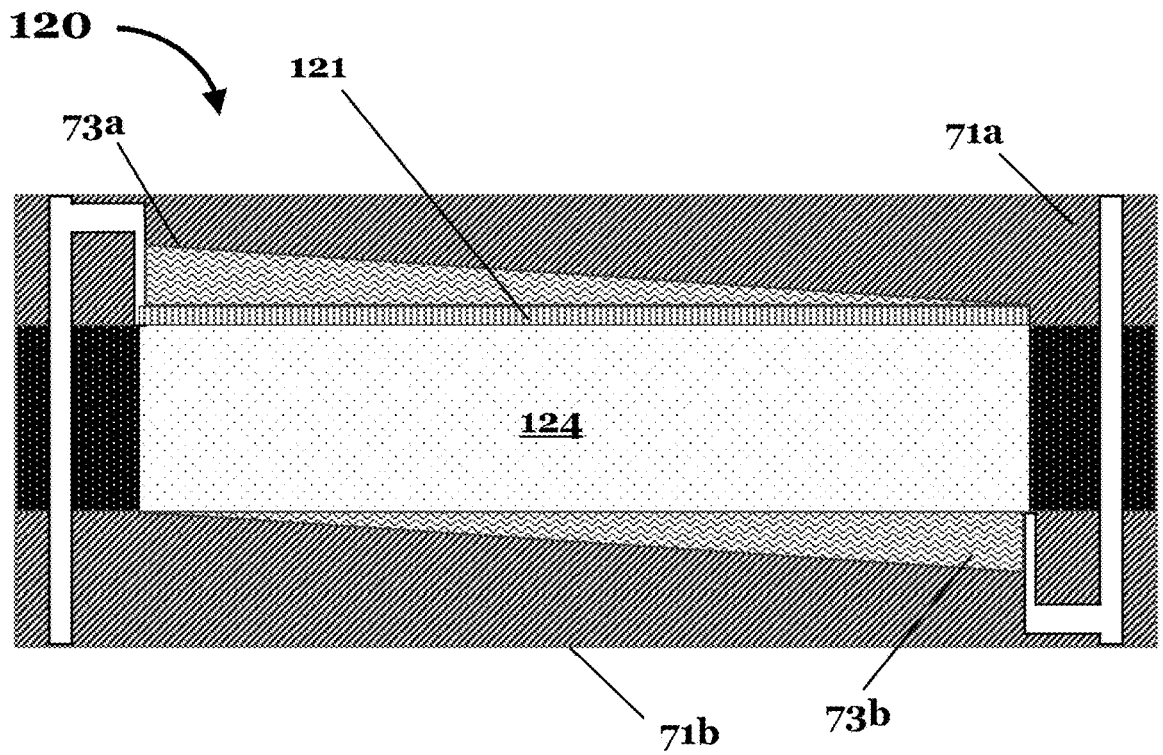
FIG. 10A is a schematic diagram of a module similar to the one shown on FIG. 6A, including a plugging layer added on top of the adsorptive media according to embodiments of the invention disclosed herein.
Figure 10B:
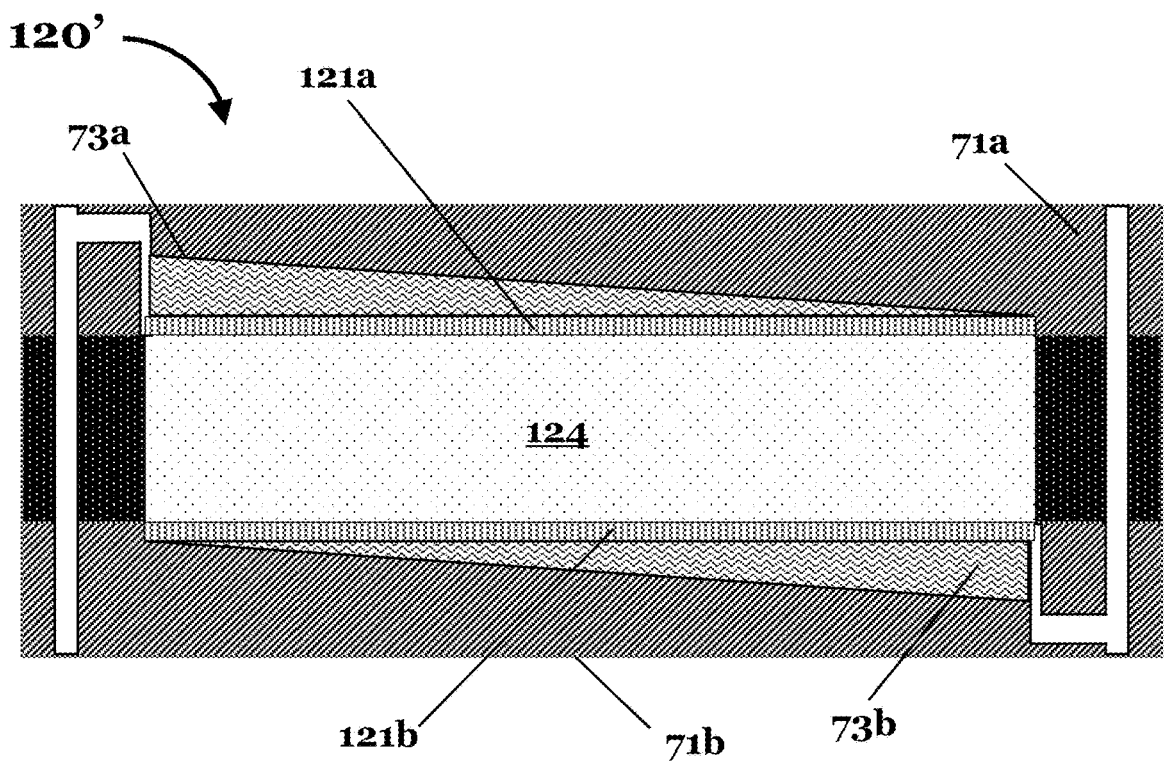
FIG. 10B is similar to FIG. 10A and includes plugging layers are added to both first and second planar surfaces of the planar media.

FIGS. 10A and 10B are schematic diagrams of modules similar to the one shown on FIG. 7A, except that in this case a plugging layer 121 is added on top of the adsorptive media 124. Module 120 includes plugging layer 121 on top of adsorptive media 124. Plugging layer 121 is disposed between convergent planar feed distributor 73a and adsorptive media 124 during the fabrication of module 120. Once the module 120 is fabricated, the module 120 HR is measured followed by HR adjustment using a plugging dispersion that is tailored to plug both the plugging layer 121a and the plugging layer 121b with a controlled plugging system 110 (FIG. 9). Note that the plugging layer becomes integrated into the planar distributor. Another embodiment is shown in FIG. 10B, where plugging layers are added to both first and second planar surfaces of the planar media. Referring to FIG. 10B, during the fabrication of module 120', plugging layer 121a is disposed between convergent planar feed distributor 73a and adsorptive media 124, and plugging layer 121b is disposed between convergent planar eluent collector 73b and adsorptive media 124. In some embodiments both plugging layers 121a and 121b are plugged; in other embodiments only one of the two plugging layers is plugged.

Suitable dispersions contain particles with diameters approximately the same as the pore size of the porous media; particles larger than the pore size of the media build a cake layer on top of the media; particles slightly smaller than the pore size of the media penetrate the porous structure of the media and get trapped in pores smaller than the diameter of the particle. Particles much smaller than the pore size of the media are not trapped by the media, and therefore, would simply pass through; such dispersions are not suitable for controlled plugging of the media.

Particles of suitable dispersions do not dissolve and do not leach into the extractable substances and can be polymeric, ceramic or metal. Examples of polymeric particles are those made of polyethylene, polypropylene, polysulfone, polyethersulfone, PEEK (polyaryletherketone), epoxy, polymethylmethacrylate, nylon, styrene/divynilbenzene, polyvinylidene fluoride ("PVDF"), polytetrafluoroethylene ("PTFE"), ethylene tetrafluoroethylene ("ETFE"), perfluoroalkoxy alkanes ("PFA"), and cross-linked hydrogels such as dextran and agarose.

In some embodiments the particles in the dispersion get trapped irreversibly even when reverse flow is applied in the media. In other embodiments the nature of the media being plugged and the particles is such that the particles can be removed partially or fully when reverse flow is applied on the media. In the latter case it is important that reverse flow be prevented to ensure that the adjusted HR of the module is not changed.

Hydraulic Resistors Embedded in Module Plates

In some embodiments the HR of the module is adjusted by means of a hydraulic resistor embedded into the module plates of the module, that enables the adjustment of HR after the module is fabricated. In some embodiments the hydraulic resistor is a frit that is inserted into the channels of the intermediate distributor which is open to the planar surfaces of the module, the adjustment consisting of selecting the correct length of the frit; the increase in HR due to the insertion of the frit being proportional to the length of the frit.

Figure 11:
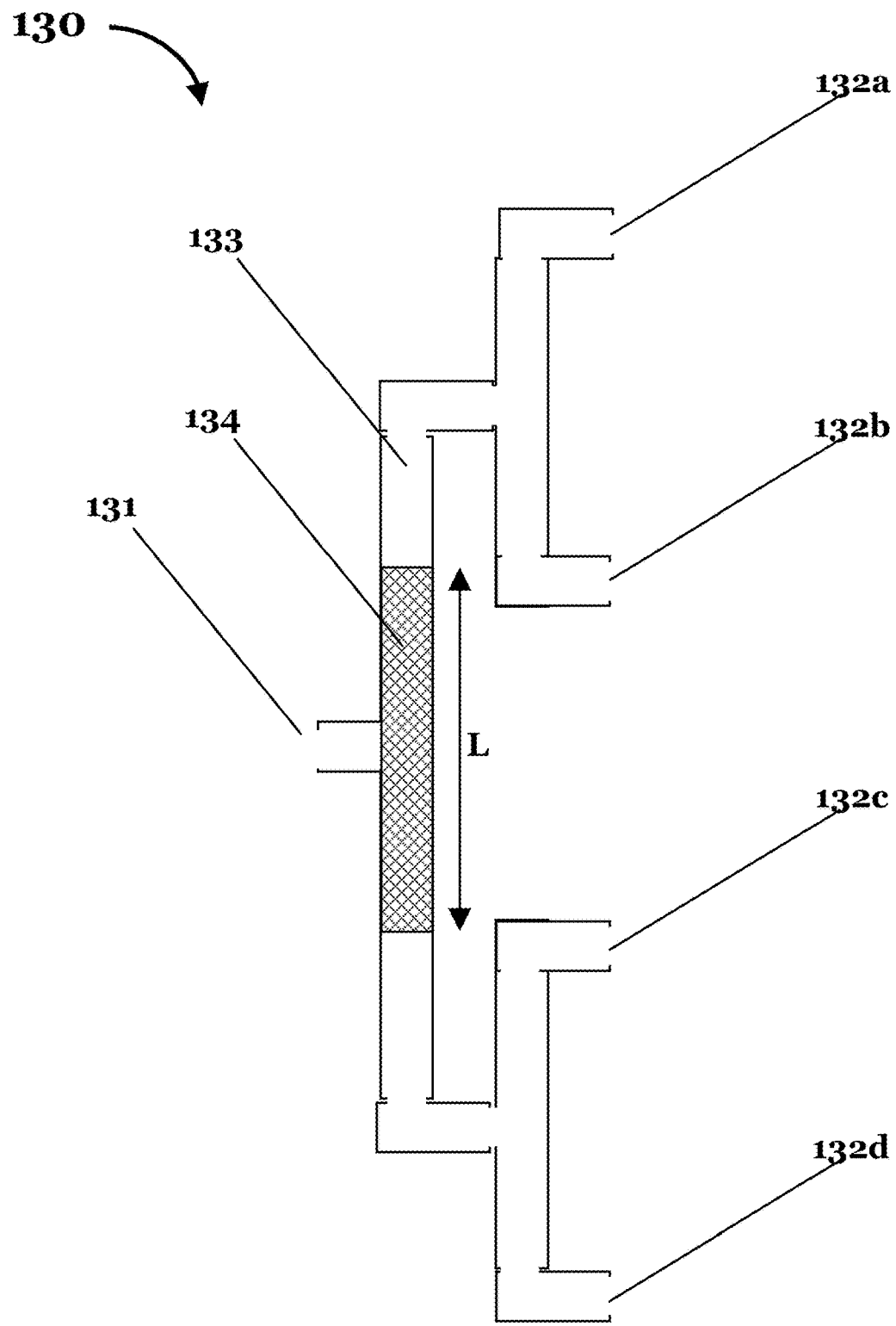
FIG. 11 is a schematic top view of the isoflo intermediate distributor of the module of FIG. 2C having four branches according to embodiments of the invention disclosed herein.

FIG. 11 is a schematic top view of the isoflo intermediate distributor of module 20 of FIG. 2C having four branches. Intermediate distributor 130 includes a two-level isoflo distributor that distributes single inlet 131 into four equal effluents 132a, 132b, 132c and 132d by virtue of each of the 4 branches being fluidically identical. A porous frit 134 having the same shape of branch 133 and having a known hydraulic resistance per unit length is cut to the appropriate length to increase the HR of the module by the desired amount to obtain the target HR. Once the module is fabricated, its HR is measured, and based on this value and the target HR, the length of the frit, L, required to obtain the target HR is calculated, the frit is cut to a length L and inserted into branch 133 of intermediate distributor 130.

In other embodiments the inserted resistor is an element inserted into the flow path that reduces the cross-sectional area of passageway(s) in the exposed intermediate distributor. In still other embodiments packed conduits is used to adjust the HR. Small diameter beads are packed into regions of the distributors designed to be packed with beads, with the increase in HR being proportional to the length of the conduits being packed with beads. In still other embodiments a miniature valve is embedded into the module plates, such that the cross-sectional area of the valve can be tuned with a mechanism, such as with a screw, akin to a needle valve.

In still other embodiments the cross-sectional area of the exposed conduits in the intermediate distributor can be enlarged, e.g., by milling the conduits to a larger dimension. In this case, the HR would be reduced. In still other embodiments a supplemental module plate can be used to increase the HR of a module. Supplemental module plates of different HR are fabricated and added to each module after the HR of the module is measured. Such a module plate is designed to fit into the stack of modules, one module plate per module.

Figure 12:
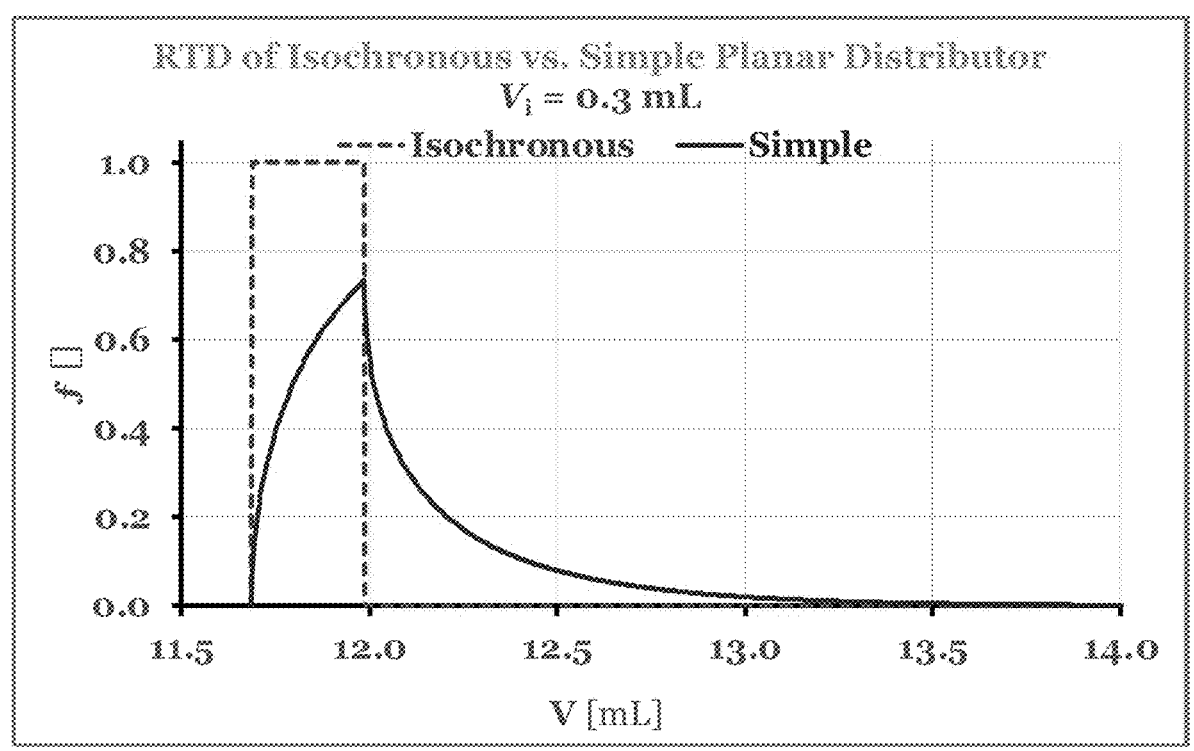
FIG. 12 is a graph of showing the residence time distribution (hereafter RTD) as a function of volume for both an Isochronous and a Simple planar distributor according to embodiments of the invention disclosed herein.

FIG. 12 is a graph of the probability density function f[ ] of the residence time distribution (RTD) with respect to volume V. The graph shows the comparatively narrow distribution of the Isochronos distributor when compares to the Simple distributor.

Sub-Modules and Level-0 Distribution

A challenge of building devices with larger volumes of planar media, given bed depths on the order of 1 cm (distance perpendicular to the planar faces), is that the planar face must be broad. The present invention addresses this primarily by an array of stacked modules to get more volume in a chromatographic system. Further some module embodiments include multiple adjacent chromatographic beds that can be included in a single module (hereafter "submodules"). These modules with submodules can then be use in an array system.

Figure 13A:
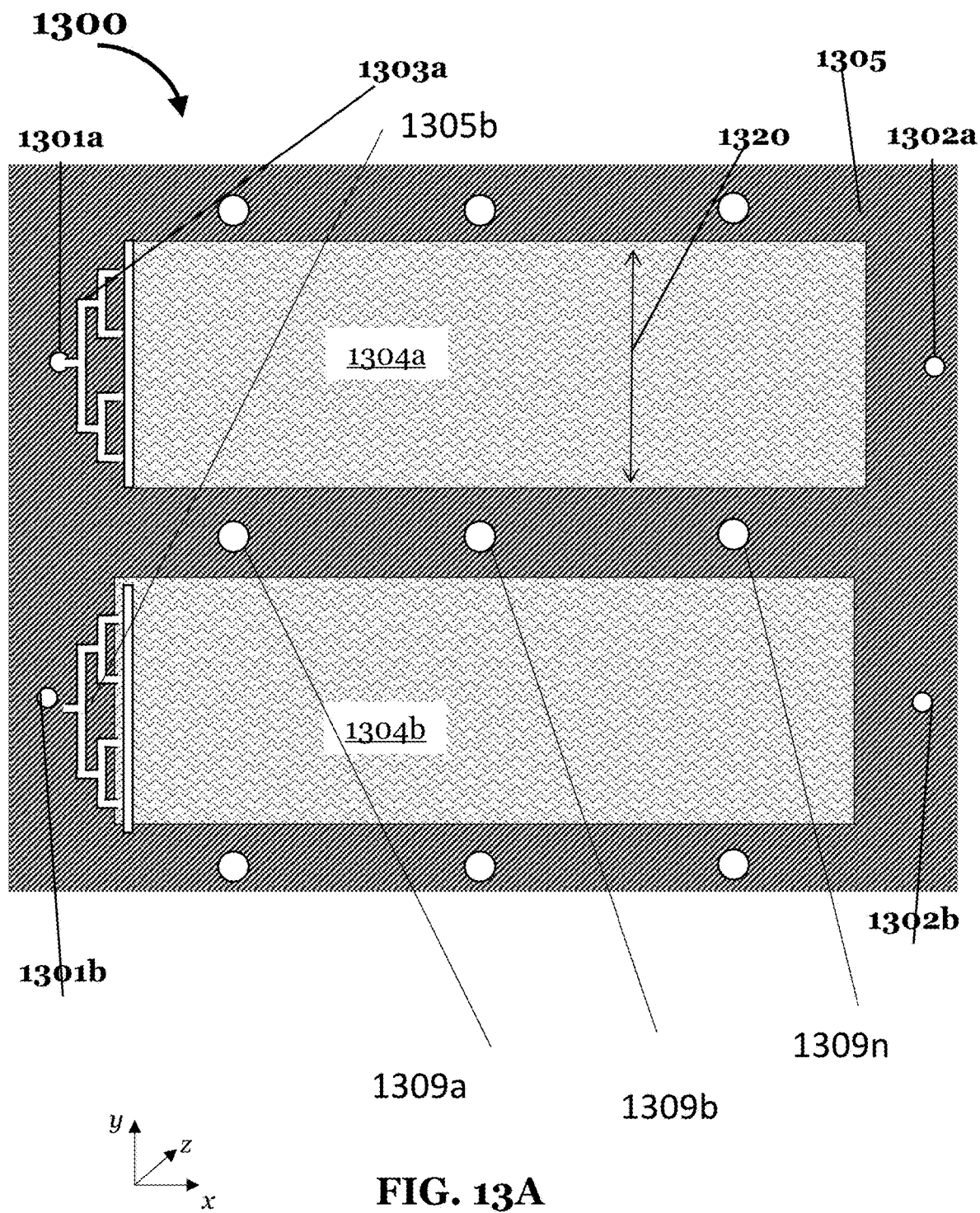
FIG. 13A shows an exemplary multiplexed submodule according to embodiments of the invention disclosed herein.
Figure 13B:
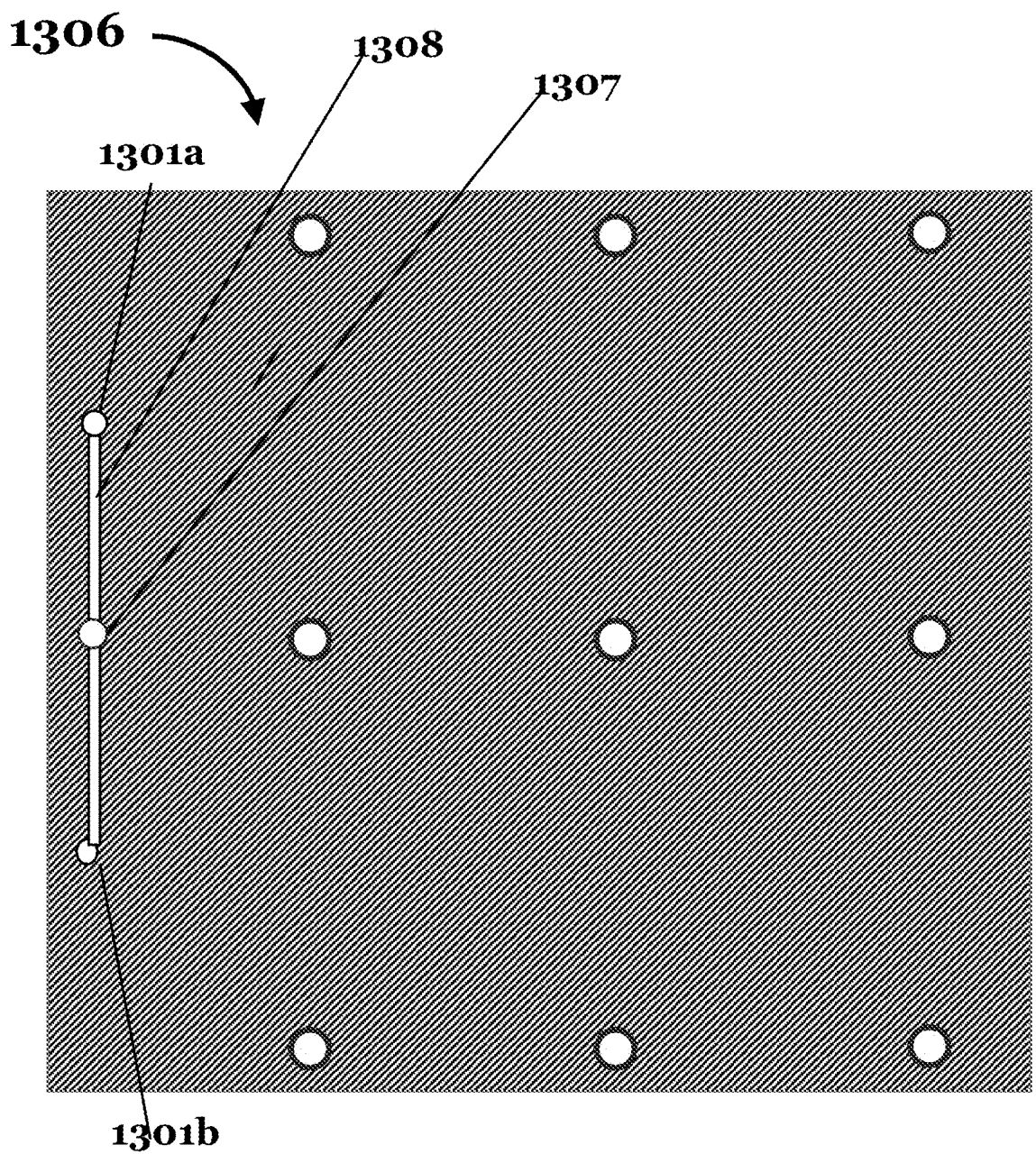
FIG. 13B shows an exemplary feed module plate of the multiplexed submodule of FIG. 13B.

Referring now to FIGS. 13A and 13B, the submodule 1300 and submodule feed end module plate 1306 each include LEVEL-1,2,3 distribution that are fluidically connected to the feed and eluent ports (or LEVEL-0 distribution) in the feed and eluent end plates. FIG. 13A submodule 1300 has a similar cross section to that of module 20 (FIG. 2C) except that submodule 1300 has two adjacent chromatographic beds. LEVEL-1 inter-module feed distributors 1301a and 1301b and LEVEL-1 inter-module eluent distributors 1302a and 1302b distinct (although the feed and eluent end can be reversed due to its anti-symmetrical geometry). The intermediate LEVEL-2 distributors 1303a and 1303b distribute into two distinct planar distributors 1304a and 1304b. The planar distributors 1304a and 1304b are in contact with the planar face of the two distinct media beds (not shown). The beds are structurally adhered into one module by peripheral seal material not shown and by module plate 1305 which in this embodiment spans the two chromatographic beds.

FIG. 13B shows an embodiment of the submodule feed end plate 1306 which would be the equivalent of feed end plate 12a of system 10 (FIG. 1) except that submodule feed end plate 1306 distributes the feed stream to two chromatographic beds through two sets of inter-module feed distributors. An equivalent eluent end plate (not shown) collects from the two submodules through two eluent inter-module distributors. Feed port 1307 is split by a LEVEL-0 distributor 1308 to two LEVEL-1 inter-module distributors 1301*a* and 1301*b*.

There are many possible configurations for the number of submodules (i.e., chromatographic beds) in each module. For example, there are multiple intermediate LEVEL-2 intermediate distributors for a single LEVEL-1 inter-module distributor; there are more inter-module distributors than there are submodules; there are fewer inter-module distributors than there are submodules. Regardless of these alternative configurations, there is only one feed and one eluent LEVEL-3 distributor per submodule. The fluid distribution system follows the LEVEL-0,1,2,3 distribution system to achieve high resolution modular chromatography.

In a module with a singular bed the planar face exposed to pressure can grow broad enough that the moment arm induces un-favorable bending or axial pressure forces in the structure of the device. These mechanical loads must be met with sufficient structural elements (such as the feed end plate, eluent end plate and module end plates, peripheral seal, or fixturing such as tie rods). The inherent weakness of a broad planar face bed can be addressed through multiple chromatographic beds within the same module as shown in FIG. 13A. This way structural peripheral seal material can support between beds which would otherwise present a large unsupported distance. The maximum deflection in a beam under pressure and fixed at both ends is proportional to the unsupported length cubed. In FIG. 13A the unsupported bed distance 1320 would be doubled if 1304*a* and 1304*b* were one bed. This would be a maximum deflection eight times higher than in submodule 1300. Further in FIG. 13A locations indicated by reference numbers 1309*a* 1309*b*, and 1309*c* represent locations through which structural elements such as tie rods can be disposed between the beds. These tie rods are equivalent to the tie rods 16 in FIG. 1. The reduction in module plate bending moment arm and addition of locations for mechanical structural elements mean that a broad planar bed which might otherwise require a heavy-duty stainless-steel fixture to compress the device against the pressure can now utilize a much smaller set of more dispersed hardware and thinner module plates while suffering less deflection.

Sackable, Planar, Cylindrical Adsorptive Devices with Isochronous Distributors

As described here, isochronous distributors are also useful in conventional chromatography columns. A new stackable, modular circular chromatography column having planar isochroous distributors is disclosed below.

Figure 14A:
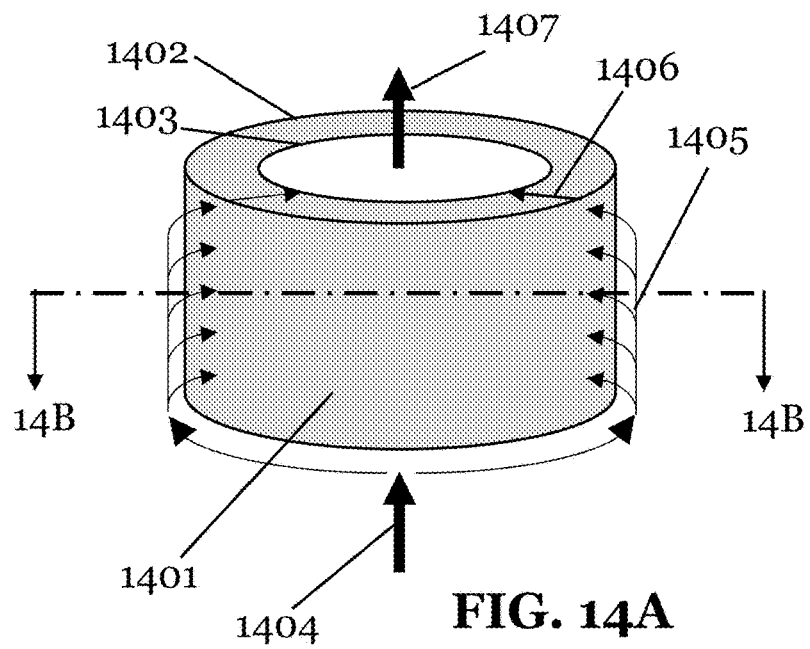
FIG. 14A is a schematic view of a radial flow bed according to embodiments of the invention disclosed herein.

The concept of the isochronous planar distributor can be applied to other adsorptive bed structures common in chromatography beyond the rectangular cassette described above. Referring to FIG. 14A, a radial flow bed 1400 includes adsorptive media 1401 in the form of an annular cylinder, having an outer surface 1402 and an inner surface 1403. Feed stream 1404 is distributed through a radial distributor (not shown) to the outer surface 1402 of adsorptive media 1401, where planar distributor on outer surface 1402 (not shown) further distributes the flow creating flow streamlines represented by flow arrows 1405 that are then directed radially from the outer surface 1402 to the inner surface 1403 of adsorptive media 1401, as represented by arrows 1406. Flow through adsorptive media 1401 is then collected by planar distributor on inner surface 1403 (not shown) to generate eluent stream as represented by arrows 1406.

Figure 14B:
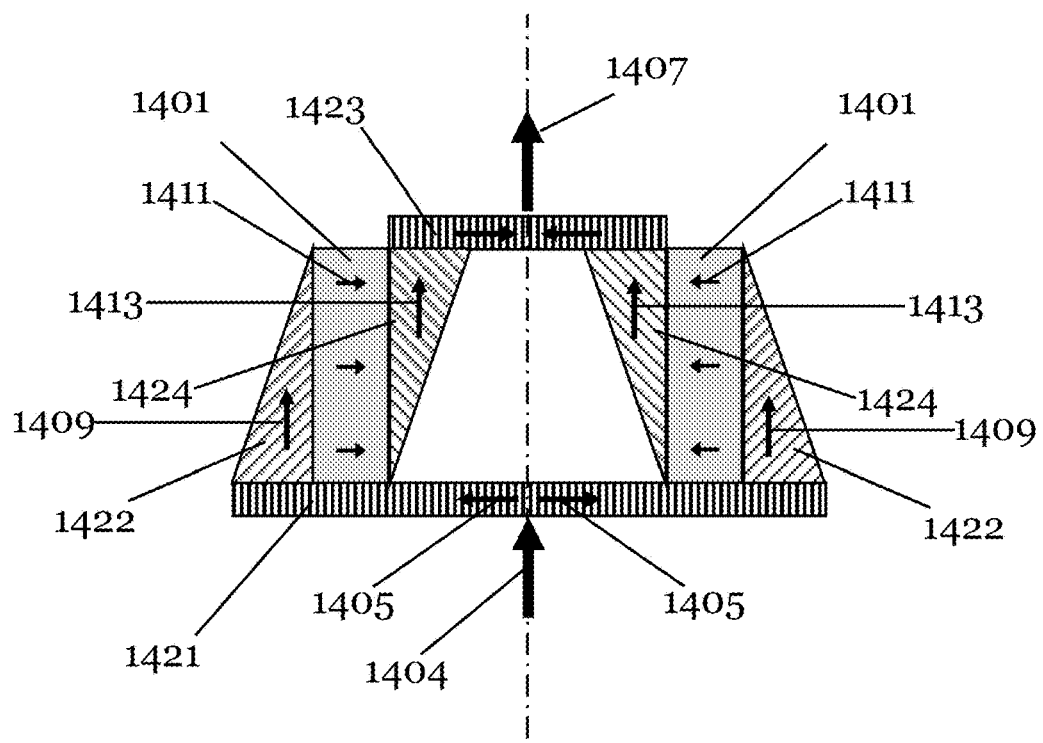
FIG. 14B is a schematic view of a cross-sectional slice of radial flow bed of FIG. 14A taken through slice 14B-14B.

FIG. 14B is a cross-sectional slice 14B of radial flow bed 1400 illustrating in detail the network of isochronous distributors. Feed stream 1404 is distributed to the outer surface 1402 of adsorptive media 1401 through intermediate distributor 1421 as represented by flow arrows 1405, in this case a radial distributor, delivering feed stream 1404 to planar distributor 1422 on the outer surface 1402 of adsorptive media 1401. Planar distributor 1422 has an annular shape further redirecting feed flow axially as represented by arrows 1409. The cross-sectional flow area of planar distributor 1422 converges along the axial dimension to maintain an approximately constant velocity as represented by arrows 1409 along the length of planar distributor 1422, enabling isochronous distribution. Flow through adsorptive media 1401, represented by flow arrows 1411, is further collected by planar distributor 1424 at inner surface 1403 of adsorptive media 1401. The cross-sectional flow area of planar distributor 1424 diverges along the axial dimension to maintain an approximately constant velocity 1413 along the length of planar distributor 1424, enabling it to be an isochronous distributor. Finally, eluent collected in planar distributor 1424 is then collected as an eluent stream 1407 through intermediate distributor 1423. Planar distributors 1422 and 1424 are isochronous distributors by virtue of having the same direction of flow (iso-direction) and an approximately constant velocity induced by the converging/diverging cross-sectional area. Isochronous distributors achieve a narrow residence time distribution.

It should be understood that in an alternative embodiment, the flow direction of radial flow bed 1400 of FIGS. 14A and 14B could be reversed, such that feed stream 1404 is fed at the inner surface 1403 and eluent stream 1407 collected at the the outer surface 1402. The direction of the flow arrows would also be reversed, but the distribution network would function in the same manner as illustrated in FIGS. 14A and 14B.

Figure 15A:
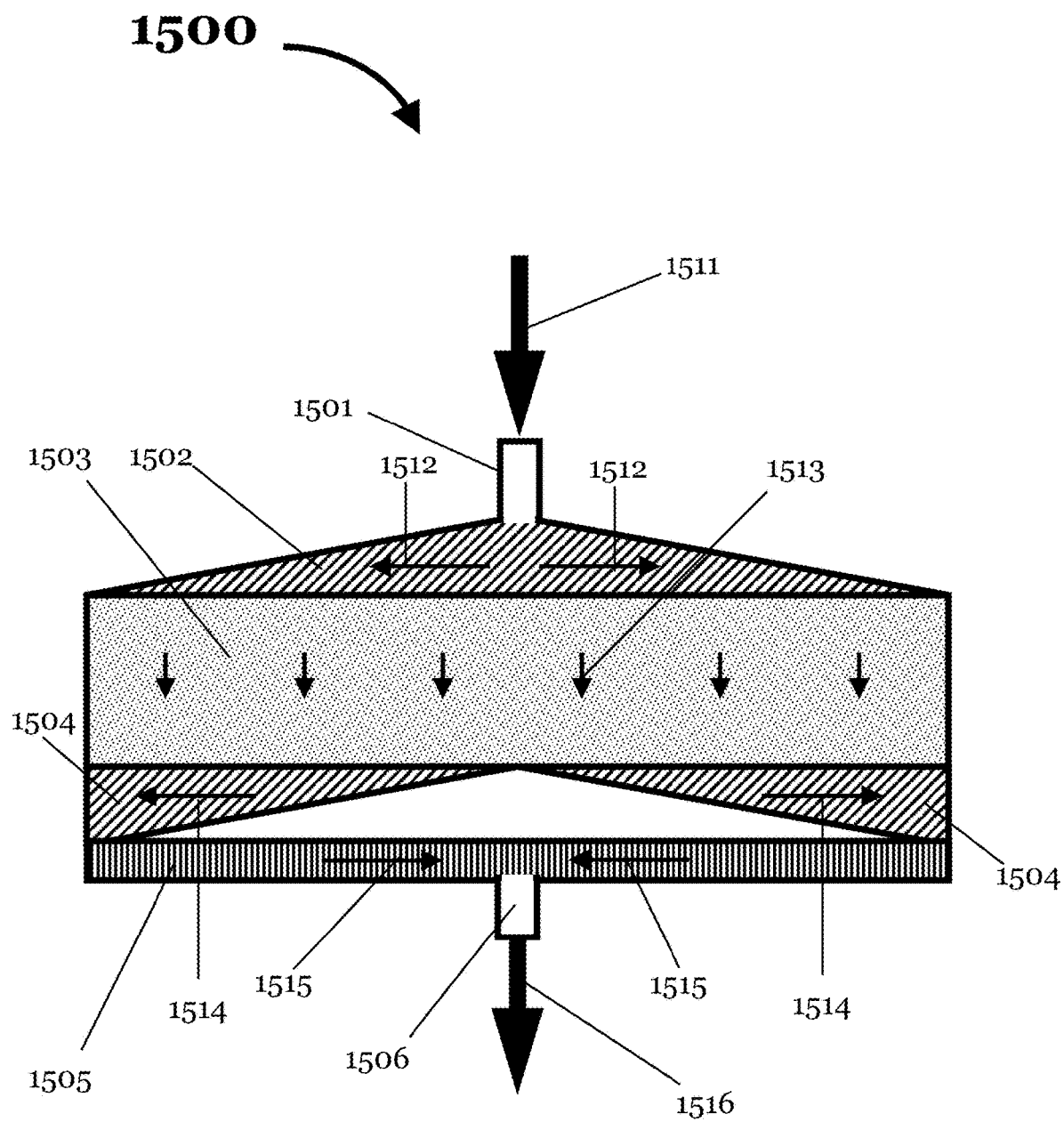
FIG. 15A is a a cross-sectional view, a cross-sectional view of a cylindrical chromatography column according to embodiments of the invention disclosed herein.

Referring to FIG. 15A, a cross-sectional view, cylindrical chromatography column 1500 includes feed port 1501, feed planar distributor 1502, adsorptive bed 1503, eluent planar distributor 1504, intermediate eluent distributor 1505 and eluent port 1506. It should be understood that these elements have a circular geometry. Feed stream 1511 is fed to the center of (radial) feed planar distributor 1502 redirecting the flow radially as represented by arrows 1512. Feed planar distributor 1502 redirects the flow into adsorptive bed 1503, as represented by axial arrows 1513. The cross-sectional flow area of feed planar distributor 1502 decreases along the radial dimension in a manner that maintains feed stream velocity approximately constant represented by arrows 1512 within feed planar distributor 1502. The liquid issuing from adsorptive bed 1503 is then collected at eluent planar distributor 1504, whose cross-sectional area for flow increases along the radial dimension in a manner that maintains eluent stream velocity 1514 approximately constant within feed planar distributor 1502. The eluent stream collected by eluent planar distributor 1504 at the perimeter of cylindrical chromatography column 1500 is then redirected to intermediate eluent distributor 1505, a radial flow distributor, that collects the eluent from the perimeter of cylindrical chromatography column 1500 and directs it to eluent port 1506 at the center of center of intermediate eluent distributor 1505 to generate eluent stream 1516. Feed planar distributor 1502 and eluent planar distributor 1504 are isochronous distributors by virtue of having the same direction of flow (iso-direction) and an approximately constant velocity maintained by the converging/diverging cross-sectional area. Isochronous distributors achieve a narrow residence time distribution.

Figure 15B:
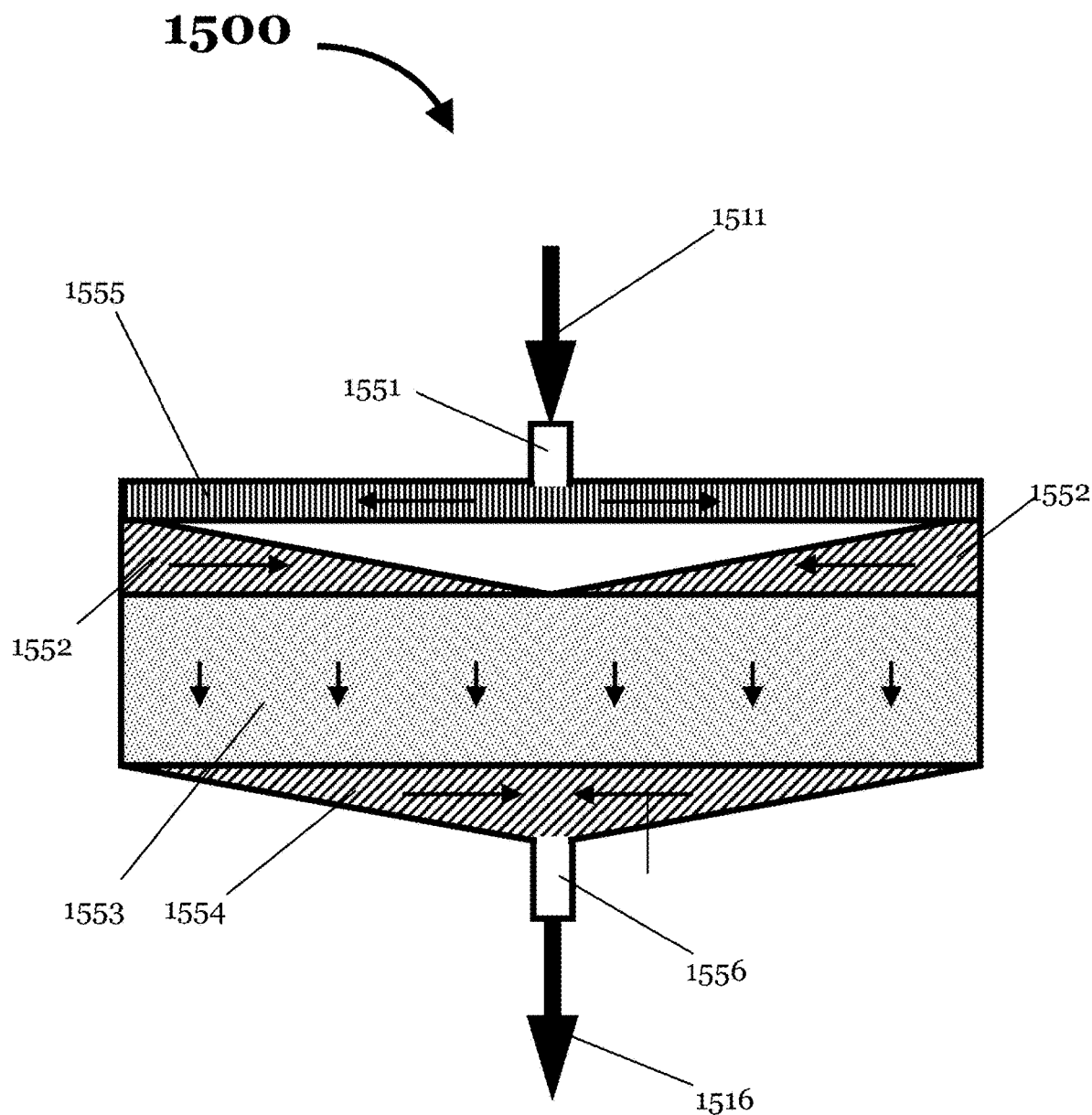
FIG. 15B is a a cross-sectional view, a cross-sectional view of a cylindrical chromatography column according to embodiments of the invention disclosed herein.

Cylindrical chromatography column 1500 can be run in reverse (i.e., the feed stream 1511 and eluent stream 1516 are inverted). Referring now to FIG. 15B, cylindrical chromatography column 1550 includes feed port 1551, connected to intermediate distributor 1555 to redirect the feed stream to the perimeter of cylindrical chromatography column 1550, which is further redirected and distributed by planar distributor 1552 to adsorptive bed 1553, and collected in planar distributor 1554, which directs the feed stream to the eluent-to-eluent port 1556. Planar distributors 1552 and 1554 are isochronous distributors by virtue of having the same direction of flow (iso-direction) and an approximately constant velocity induced and maintained by the converging/diverging cross-sectional area.

It should be noted that the thicknesses of all the distributors shown in FIGS. 14A, 14B, 15A and 15B are not illustrated to scale but are exaggerated for illustration purposes. To obtain high resolution in the adsorptive chromatographic device described herein it is important that the volume of the distributors be maintained as small as possible to reduce the chromatographic dispersion induced by the distributors. We define the extra-bed volume as the fractional volume of the device that is outside the adsorptive media:

$$\text{Extra-bed Volume} = \frac{\text{Total Device Volume}}{\text{Media Volume}} - 1$$

and it is represented as a fraction or a percentage. In some embodiments the extra-bed volume is less than 50 percent; in still other embodiments it is less than 30%; in still other embodiments it is less than 15 percent; in still other embodiments it is less than 10%; in still other embodiments it is less than five percent.

Figure 16A:
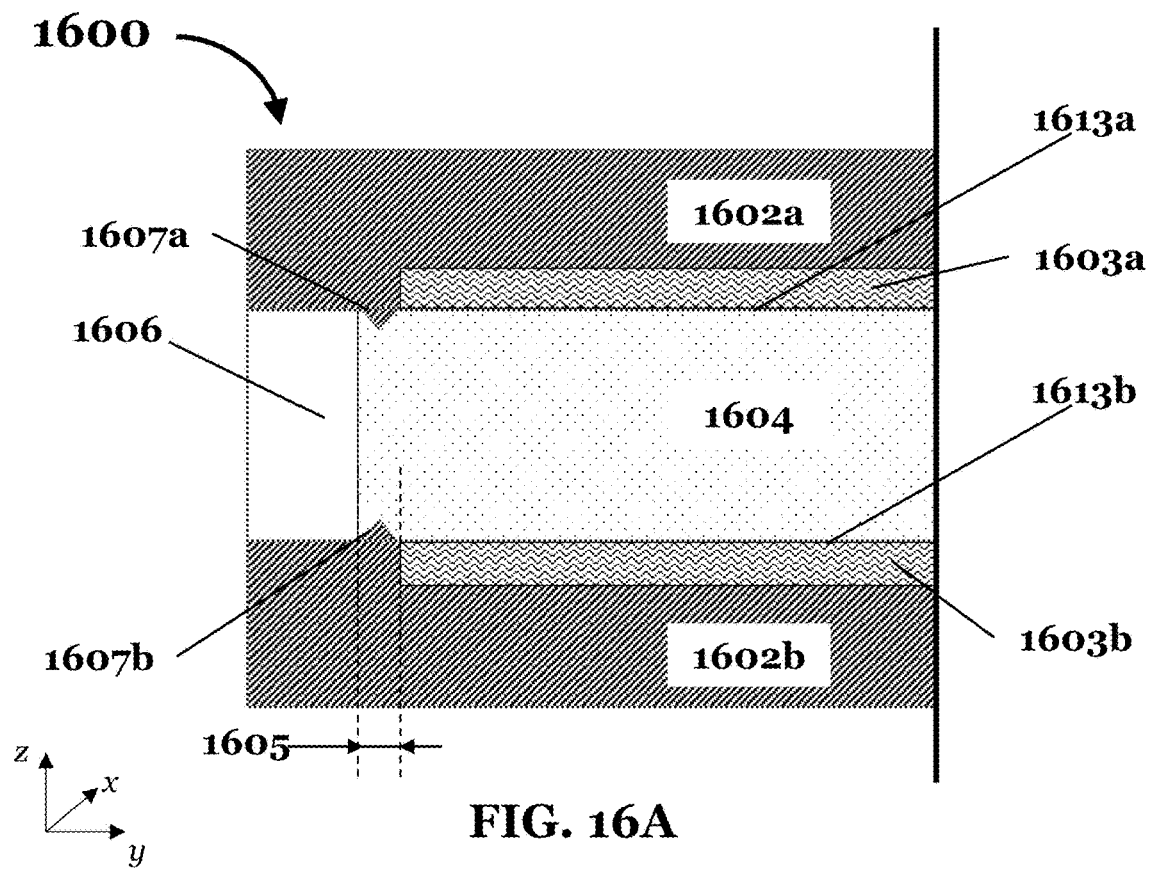
FIG. 16A is a schematic front view of an adsorptive block prior to encasement by a peripheral seal according to embodiments of the invention disclosed herein.
Figure 16B:
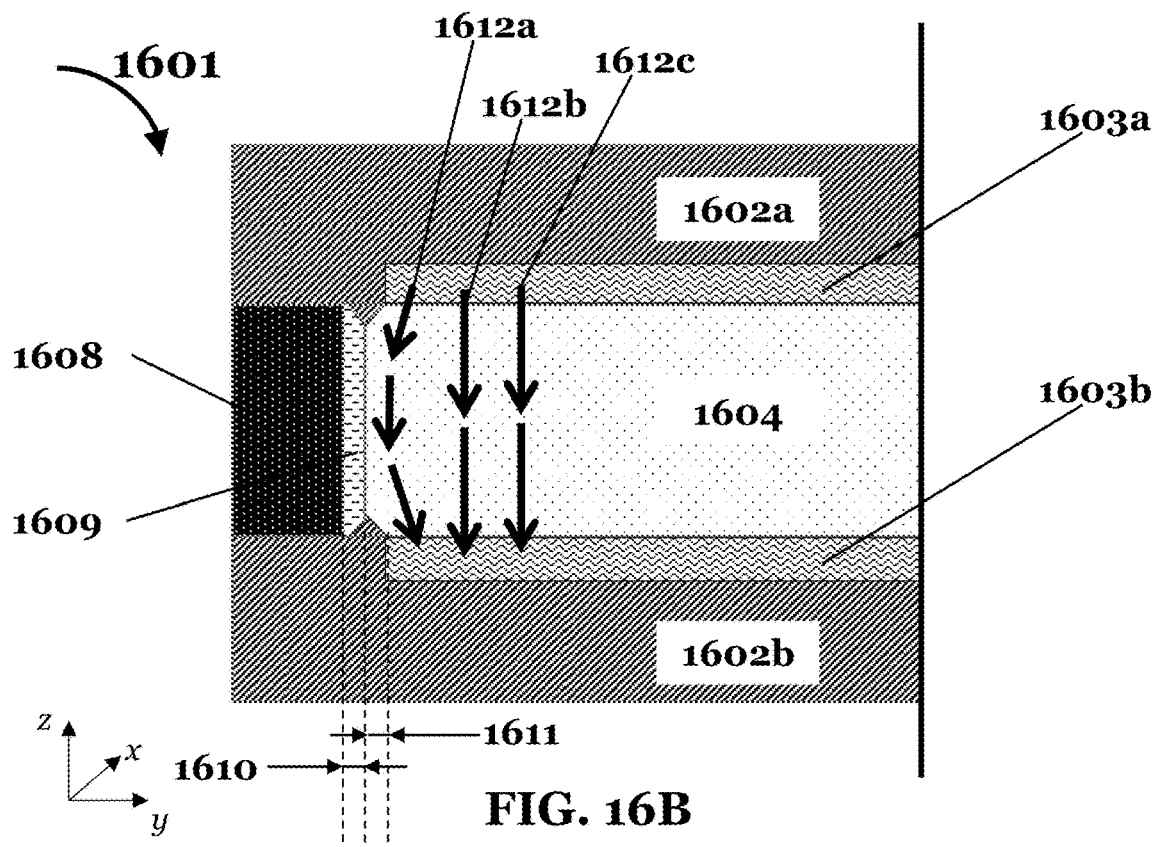
FIG. 16B is a schematic front view of an adsorptive block after encasement by a peripheral seal according to embodiments of the invention disclosed herein.

Referring to FIG. 16A, an embodiment of an adsorptive block 1600 prior to the encasement by a peripheral seal is shown. The module plates 1602a and 1602b include planar distributors 1603a and 1603b. The end plates 1603a and 1603b are in contact with and compress chromatographic media bed 1604 prior to being encased by the peripheral seal 1608 (as shown in FIG. 16B). Before final assembly, region 1606 does not include the peripheral seal 1608. The compression between module plate and bed prior to encasement by the peripheral seal is determined by either; a fixed target final bed depth set by hard stops designed into the module plates or designed into fixturing for the module plates, or a controlled compressive load between the elements to reach a target compressive stress level in the bed. The goal of the bed compression is that subsequent fluid forces do not further deform the bed (any deformation can result in inferior resolution in chromatography) as well as uniform bed depth and volume in beds of different modules in an array.

The open channels of the planar distributors 1603a and 1603b substantially cover the full first or second planar face of the bed XY plane at 1613a and 1613b, but not fully to its edge of region 1606. The peripheral seal offset region distance 1605 exists to prevent the peripheral seal material used for encasement from entering the planar distributors 1603a and 1603b when it is injected in a fluid state. The peripheral seal encasement is achieved through a variety of alternatives including injectable solidifying materials, epoxies, urethanes, silicone, and thermoplastic polymers. When filling region 1606 if peripheral seal material enters the planar distributors 1603a or 1603b, fluid distribution Is compromised. Further the use of design elements on the module plate in the peripheral seal offset region can prevent peripheral seal material from intruding between the module plate contact surface and the bed to enter the planar distributor. For example, holding teeth 1607a and holding teeth 1607b are a means of a media-bite. Holding teeth 1607a and holding teeth 1607b bite into the media to create a highly localized increase in surface stress such that the seal material is unable to intrude into the planar distributor 1603a and 1603b at the region adjacent peripheral seal offset region distance 1605. This feature also creates a more tortuous path for the seal material to flow past to intrude in the planar distributor. The effect can also be achieved through a series of small concentric grooves in the module plate located in the peripheral seal offset region. The grooves create highly torturous path for the seal material to traverse to intrude into the planar distributors. Further the media itself can be prepared with features equivalent to, or complementary to, those present in the module plates at the peripheral seal offset region. The features between module plate and media in that region can interlock or interact such that they prevent intrusion into the planar distributors and/or help locate the media in the correct location prior to the peripheral seal encasement.

Now referring to FIG. 16B, device 1601 shows adsorptive block 1604 after the encasement of the peripheral seal 1608. There is a new peripheral seal region 1609 in which the peripheral seal material has intruded a penetration distance 1610 into the porous structure of adsorptive block 1604. Peripheral seal region 1609 is a combination of peripheral seal material and adsorptive block 1604, creating a desirable seal by filling the end of adsorptive block 1604 with solid peripheral seal material. The penetration distance 1610 is similar to but not necessarily equal to as the peripheral seal offset region distance 1605 of FIG. 16A. In some embodiments, the penetration distance is the same as peripheral seal offset region distance 1605, in which case distance 1611, the distance between the edge of the planar distributor and peripheral seal region 1609 is zero; as will be explained shortly, it is desirable to make offset distance 1611 as small as possible. In other embodiments distance 1610 is slightly smaller than peripheral seal offset region 1605 such that there is a small non-zero offset distance 1611, referred to hereafter as a fluid dead zone. This fluid dead zone is sub-optimal because it creates a region in flow through the bed that is not uniform. Flow arrows 1612a-1612c show the flow moving through that region. Flow arrows 1612b and 1612c proceed from feed planar distributor to eluent planar distributor perpendicular to the planar faces of the bed. In contrast, as a result of the fluid dead zone region flow arrows 1612a follows a longer path which is, therefore, longer and, therefore, has a longer residence time making it sub-optimal.

The penetration distance 1610 is controlled by factors including, for example, the viscosity of the peripheral seal material, the cure time, the pressure of injection, the pore size of the media etc. Preventing the peripheral seal material from penetrating too deeply and entering the planar distributors is generally facilitated by a higher viscosity, and shorter cure time for the peripheral seal material. A large intrusion distance 1610 is generally facilitated by a lower viscosity and longer cure time material. Each of the peripheral seal offset region 1605 and holding teeth 1607a and holding teeth 1607b can be chosen given fixed encapsulation process parameters such that distance 1611 is minimized. However, the distance 1610 can also be controlled by various means such that the intrusion of peripheral seal into media bed is optimized to reduce distance 1611. If the peripheral seal is an epoxy or similar two-part curing material there are several options. A thickening agent, such as fumed silica, can be added in a low percentage to the mixture to control the viscosity of the material and thus control the amount of intrusion prior to cure. Many two-part materials are characterized by a pot life during which viscosity varies prior to crosslinking and hardening. By waiting a fixed amount of time between initially mixing the material (starting the pot life) and injecting the material into region 1606, the viscosity of the material at the time of contacting the media is controlled. Thermoplastic parameters such as temperature and pressure can be modified to control viscosity and cure time to produce optimal variation in distance 1610.

Further control of the penetration distance 1610 is possible with multi-step processes for the application of the peripheral seal material. In some embodiments a two-step process can be used to form peripheral seal 1608 and seal 1609. In these embodiments, peripheral seal region 1609 is first formed by applying a limited amount of peripheral seal material (e.g., an epoxy) which is allowed partially cure or cure completely before applying the epoxy necessary to form peripheral seal 1608. In still other embodiments the peripheral seal material is applied as a first step only to the edge defined by the module plates 61a and 61b and adsorptive block 64 and then allowed to partially cure or cure completely before applying the epoxy necessary to form peripheral seal 1608. In still other embodiments different peripheral seal materials can be used for the two steps, each one having viscosities and curing times advantageous for each step. These multi-step potting processes are designed to prevent adverse intrusion into the distributor channels.

In still other multi-step processes for controlling intrusion distance 1610 is a controlled wetting of the media itself prior to potting. In general, the wetting of the media, filling the pores partially with water allows control of the intrusion distance 1610. A multi-step process to control distance 1610 involves wetting the media bed, then drying the edges in the peripheral seal offset region 1605 sufficiently to allow intrusion into that region and to control distance 1610.

Figure 17:
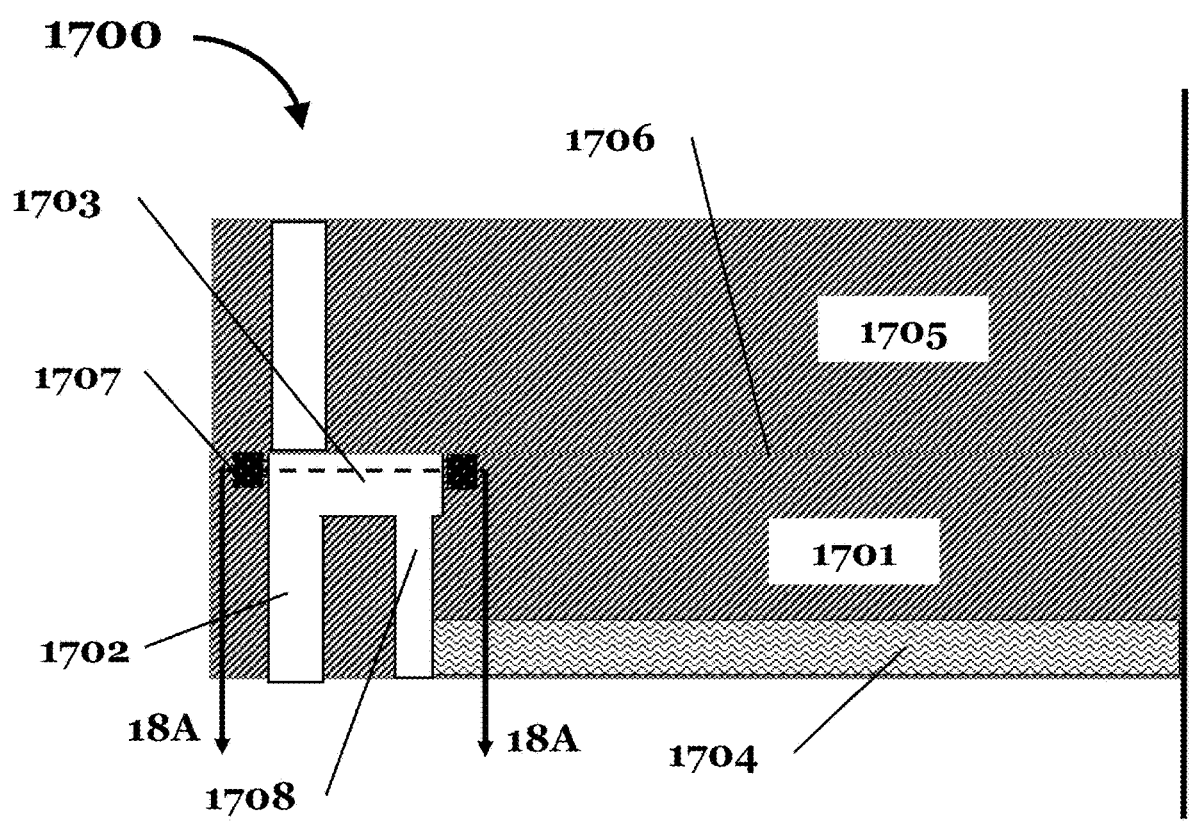
FIG. 17 is a schematic front view of a feed or eluent module plate with distribution system according to embodiments of the invention disclosed herein.
Figure 18A:
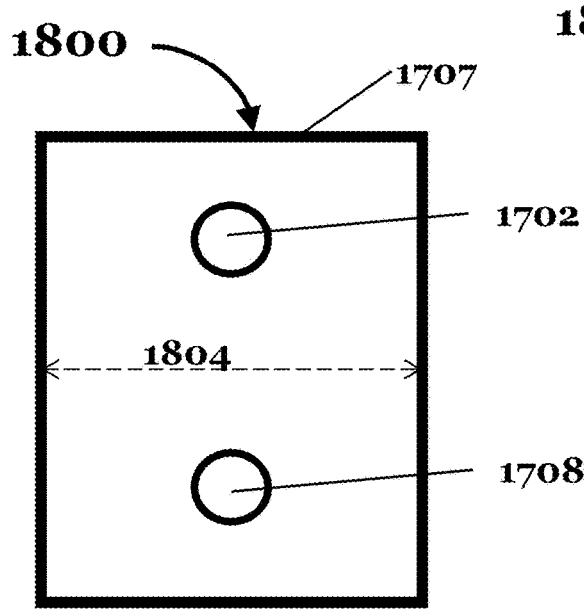
FIGS. 18A-18D shows four exemplary cross-sectional views of intermediate distributors having HR Adjustment features according to embodiments of the invention disclosed herein.
Figure 18B:
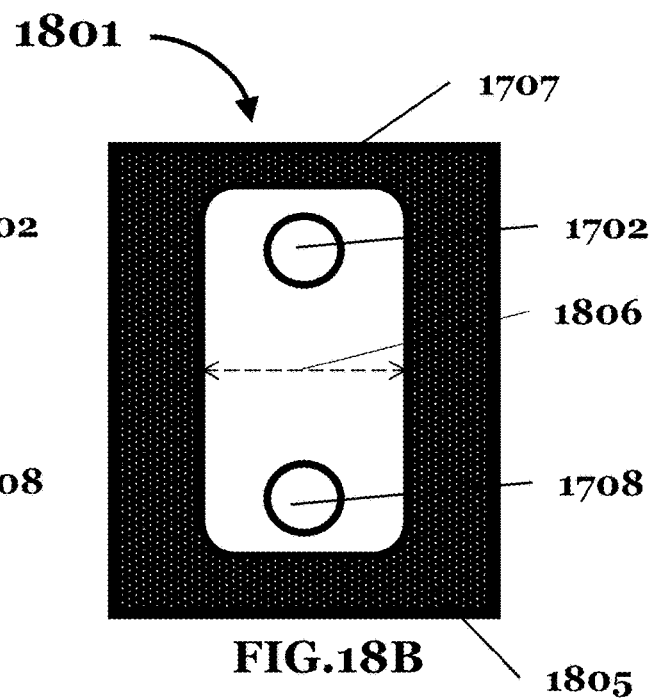
Figure 18C:
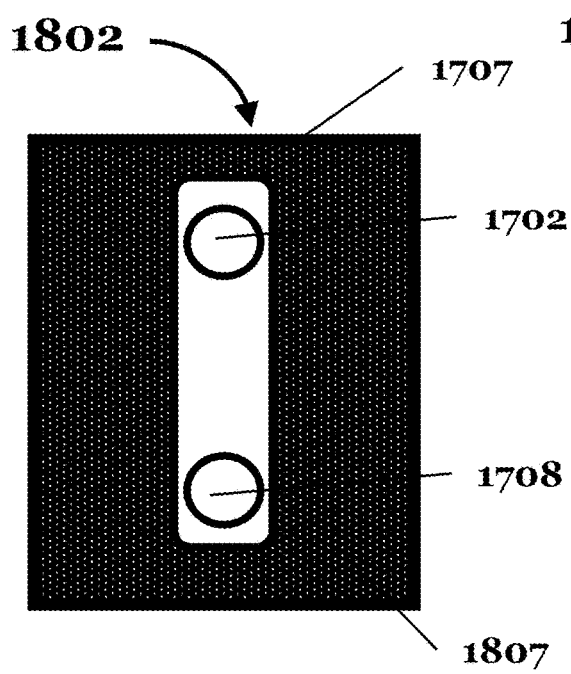
Figure 18D:
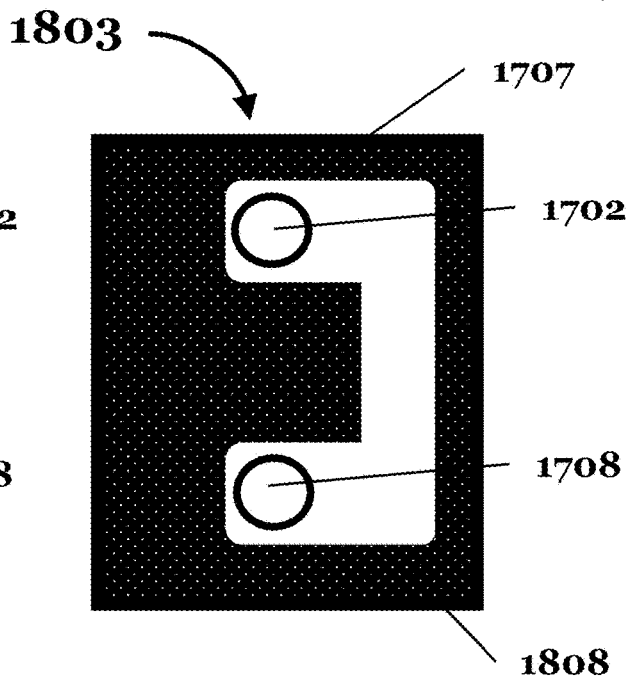

Referring now to FIG. 17, device 1700 includes a feed module plate 1701 and eluent module plate with a distribution system similar to the distribution system including feed module plate 21a and eluent module plate 21b (FIG. 2). Module plate 1701 includes a LEVEL-1 inter-module distributor 1702, a LEVEL-2 intermediate distributor 1703 and a LEVEL-3 planar distributor 1704. In one embodiment the intermediate distributor 1703 fluid channels and seal are completed by bringing together module plate 1701 with a module plate 1705 at interface 1706. An intermediate distributor section 1708 connects intermediate distributor 1703 to planar distributor 1704. In another embodiment, there is a seal 1707 between the two faces. The module plates 1701 and 1705 in an embodiment are parts of two separate adsorptive block modules stacked similar to modules 11a-11n (FIG. 1). The module plate 1705 is coupled to module plate 1701 to complete or modify the intermediate, or inter-module, distributor. This module plate 1701 which modifies distribution is included in a stack such as shown in FIG. 1 without being a part of the adsorptive block modules. Further the module plate 1705 is coupled to module plate 1701 such that the module plate becomes part of an absorptive block module. Module plate 1705 is instead one of feed end plate 12a and eluent end plate 12b (FIG. 1) which has a feature to complement the distributor on 1701. The benefit to having 1705 separable from 1701 during testing or between operations is to allow access to the intermediate distributor 1703. That access is especially useful for insertion or adjustment of a Type-2 hydraulic adjustment feature embedded within the LEVEL-2 intermediate distributor 1703 and 1708. In embodiments having modules in a stack, the HR Adjustment feature is not accessible, and in embodiments in which when they are separated, the adjustment mechanism is accessible for tuning. Arrow 18 indicates a top-down view of the inter-module distributor 1702, intermediate distributor 1703 and planar distributor 1704 shown in FIGS. 18A-18D.

FIGS. 18A-18D show four XY cross section views of intermediate distributors 1800, 1801, 1802 and 1803, similar to intermediate distributor 1703 described above, which connect inter-module distributor 1702 to the intermediate distributor section 1708. It is noted that FIGS. 18A-18D are rotated 90° relative to a cross-sectional cut 18-18 on FIG. 17.

Intermediate distributor 1800 includes inter-module distributors 1702 and inter-module distributors 1708 fluidly connected to planar distributor 1701 and seal 1707. Fluid flow uses the full cross section location 1804. In example 1801 a resistor gasket 1805 is inserted into the distributor space which functions as a Type-2 hydraulic adjustment device. The gasket changes the cross section available to flow between inter-module distributors 1702 and 1708 from cross section location 1804 down to cross section location 1806. This change increases the hydraulic resistance of the overall distribution system and chromatographic module. It is important to not change the resistance of the inter-module distributor itself, which would affect every module downstream fluidly coupled in a parallel stack (array of modules). The hydraulic resistance from inter-module distributors 1702 to 1708 effects the hydraulic resistance within one module on either the feed end, eluent end, or both. Example 1802 shows resistor gasket 1807 further narrowing the cross section. Immediate distributor 1803 resistor gasket 1808 (FIG. 18D) adds extra tortuosity to the flow path to effect the hydraulic resistance. In addition to changing cross sectional area a Type-2 adjustment feature and a resistor gasket especially could change the path length of a section of the distributor without changing the cross-sectional area to tune resistance. The resistor gaskets of FIGS. 18B-18D, 1805, 1807 and 1808, respectively are held in place by module plates adjacent in a stack of modules or by being otherwise affixed by hardware, adhesive, or entrapped by a piece affixed above it.

Figure 19:
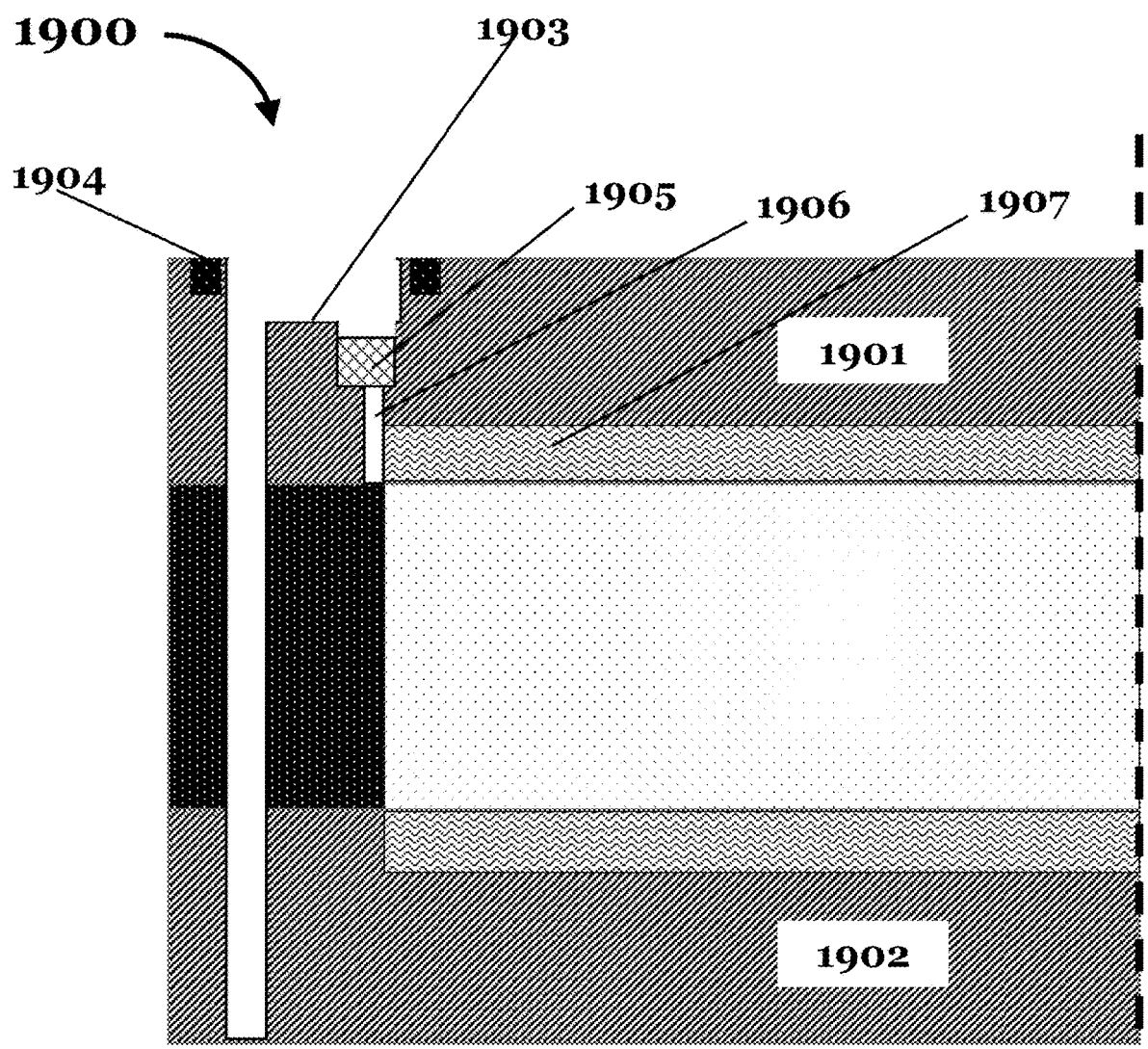
FIG. 19 is a schematic front view of an HR Adjustment feature according to embodiments of the invention disclosed herein.

FIG. 19 illustrates a chromatography system 1900 including a Type-2 HR (hydraulic resistor) adjustment feature 1905. Module plate 1901 is similar to module plate 1701 (FIG. 17) with its distribution levels. The intermediate distributor 1903 is completed by bringing together module plate 1901 with another module plate (not shown) to complete the seal at 1904. In this embodiment there is a space to insert a Type-2 HR adjustor 1905 (for example a hydraulic resistor 1905) in the intermediate distributor 1903 where the intermediate distributor 1903 turns down in the Z axis at intermediate distributor 1906 toward the planar distributor 1907. This arrangement allows the adjustment of HR by adding the hydraulic resistor 1905 into the intermediate distributor 1903 when the module plates 1901 are separated but after the device 1900 fabrication is complete. If the hydraulic resistor 1905 is a porous material the adjustment involves different porosity or pore size resistors. Additional layers of a non-woven material, screen, or frit are used as the hydraulic resistor 1905. By adjusting the depth of the porous material insert (equivalent to the flow path length) the HR of the module is adjusted. The hydraulic resistor 1905 could also be an orifice of various diameters and lengths to modify cross sectional area or path similar to the use of the Type-2 resistor gasket in FIG. 18. The hydraulic resistor 1905 becomes a Type-1 HR Adjustment feature if it is a porous material plugged to a tuned resistance in a subsequent operation. The hydraulic resistor 1905 is retained or held in place by an adjacent module plate 1901, or an adjacent module in a stack of modules or by being affixed by hardware, adhesive, or entrapped by a structure affixed above it within the same module.

It is understood that although the embodiments described herein relate specifically to separations of interest in biomolecular applications, the principles, practice and designs described herein are also useful in other applications, including but not limited to the manufacture of vaccines and other macromolecules not necessarily of a biological nature.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. The descriptions and diagrams of the methods described herein can be performed in any suitable order unless otherwise indicated herein or otherwise clearly contradicted by context.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system comprising:
   a feed end plate, having a feed port;
   a plurality of fluidly connected modules stacked adjacent to the feed end plate and fluidly coupled to the feed port;
   an eluent end plate having an eluent port, disposed opposite the feed end plate with the plurality of fluidly connected modules disposed in between the feed end plate and the eluent end plate;
   wherein each one of the plurality of fluidly connected modules comprises:
   a chromatographic media bed having first and second planar surfaces;
   a distribution network comprising:
      an inter-module (LEVEL-1) distributor pair adjacent to the chromatographic media bed, a first one of the inter-module LEVEL-1 distributor pair having at least one passageway substantially perpendicular to the first and second planar surfaces and fluidly coupled to the feed port and a second one of the inter-module LEVEL-1 distributor pair having at least one different passageway substantially perpendicular to the first and second planar surfaces and fluidly coupled to the eluent port;
      an intermediate (LEVEL-2) distributor pair, a first one and a second one of the LEVEL-2 distributor pair disposed on opposite sides of the chromatographic media bed, having an array of passageways approximately parallel to the planar surfaces and fluidly coupled to a corresponding one of the inter-module LEVEL-1 distributor pair; and
      a planar (LEVEL-3) distributor pair, each of a first one and a second one of the planar LEVEL-3 distributor pair fluidly coupled to the respective first and second ones of the intermediate LEVEL-2 distributor pair and each one of the pair having an array of passageways parallel to the first and second planar surfaces, the first one of the pair in contact with the first surface of the chromatographic media bed and the second one of the pair in contact with the second surface of the chromatographic media bed.

2. The system of claim 1, wherein each one of the pair of each distributor pair LEVEL-1, LEVEL-2 and LEVEL-3, is substantially identical to the other one of the distributor pair and is rotated 180° about an axis perpendicular to the sides of a module and located on the opposite ends (opposite faces) from the other one of the distributor pair.

3. The system of claim 1, where each of the first and second intermediate LEVEL-2 distributor pair is an isoflo distributors.

4. The system of claim 1 wherein a cross sectional flow area of each one of the planar LEVEL-3 distributor pair converges approximately linearly from a first end down to approximately zero at a second end oppositely disposed from the first end, inducing a fluid to have a uniform velocity.

5. The system of claim 4 wherein a cross sectional flow area convergence towards at least 20% of its initial value inducing an approximately uniform velocity.

6. The system of claim 4 wherein each of a first one and a second one of the planar LEVEL-3 distributor pair further comprises one of:

an array of channels;
a non-woven spacer with a converging cross sectional flow area;
an array of woven spacers; and
an array of woven spacers with a converging cross sectional flow area.

7. The system of claim 1, wherein each of the plurality of fluidly connected modules further comprise a first module plate and a second module plate disposed adjacent the first and second planar surfaces of the chromatographic media bed and wherein respective ones of the intermediate LEVEL-2 distributor pair and the planar LEVEL-3 distributor pair are embedded in the respective first and second module plates.

8. The system of claim 7, further comprising a peripheral seal, encapsulating the chromatographic media bed, and the peripheral seal structurally coheres the first and second module plates to the chromatographic media bed.

9. The system of claim 8 wherein the peripheral seal intrudes into the chromatographic media bed in a peripheral seal offset region such that a fluid dead zone, in the peripheral seal offset region, is substantially eliminated.

10. The system of claim 8, wherein the first module plate and the second module plate comprise a media-bite to prevent intrusion of the peripheral seal into the planar distributors; and
wherein the peripheral seal comprises at least one of:
epoxy;
urethane;
thermoplastic polymers; and
silicone.

11. The system of claim 7 wherein each of the plurality of fluidly connected modules further comprises at least one permeable substantially rigid sheet sandwiched between at least one of the first and second planar surfaces of at least one bed of the chromatographic media and the respective planar distributor.

12. The system of claim 7, wherein the chromatographic media bed being brought in contact with the first and second module plates prior to encapsulation by one of:
compression of the chromatographic media bed by the first and second module plates to a target compressive stress level such that subsequent fluid forces do not further deform the bed; and
compression of the chromatographic media bed by the first and second module plates to deflect it to a target bed depth.

13. The system of claim 1, wherein a hydraulic resistance of one of the plurality of fluidly connected modules is adjusted to a target value substantially equal to another different one of the plurality of fluidly connected modules by one of:
controlled plugging of the media in the chromatographic bed with a dispersion of solids; and
adjustment of an adjustable hydraulic resistor embedded within the intermediate LEVEL-2 distributor pair.

14. The system of claim 1, wherein the chromatographic media bed is one of:
an adsorptive woven web;
an adsorptive non-woven web;
an adsorptive membrane;
an adsorptive monolith;
adsorptive beads packed in a monolith; and
adsorptive beads packed in a lattice.

15. The system of claim 1 wherein the feed end plate and eluent end plate further comprise a LEVEL-0 distributor that connects the respective feed and eluent ports to the inter-module LEVEL-1 distributor pair.

16. The system of claim 1 wherein a cross sectional flow area of one of the passageways of the array of passageways of the inter-module LEVEL-1 distributor pair adjacent the feed end plate converges approximately linearly from the feed module plate towards the eluent module plate, and wherein a cross sectional flow area in the other one of the passageways of the inter-module LEVEL-1 distributor pair adjacent the second end converges approximately linearly away from the eluent module plate towards the feed module plate, inducing a fluid flow to have a uniform velocity.

17. The system of claim 1, wherein at least one of the plurality of modules further comprises a plurality of interconnected submodules.

18. The system of claim 1, further wherein at least one of the plurality of modules comprises a plurality of interconnected submodules.

19. The system of claim 18, wherein at least one of the plurality of interconnected submodules comprises multiple chromatographic media beds within each module.

20. The system of claim 1, wherein the distribution network induces a plurality of streamlines having approximately equal lengths.

21. A method comprising:
providing a modular chromatographic system having a plurality of stacked modules, each stacked module including a chromatographic media bed having first and second planar surfaces and including a multilevel distribution network of each stacked module;
distributing a feed stream to the chromatographic media bed, wherein a flow through the multilevel distribution network induces a plurality of streamlines having substantially equal lengths;
inducing an isomikos flow through the multilevel distribution network; and
collecting an eluent stream from the chromatographic media bed.

22. The method of claim 21, further comprising adjusting a hydraulic resistance of each of the plurality of stacked modules to a target value substantially equal to that of all the other modules in the plurality of stacked modules.

23. The method of claim 22, further comprising adjusting the hydraulic resistance of each one of the plurality of stacked modules by one of:
controlled plugging with a dispersion of solids;
adjustment of an adjustable hydraulic resistor in the multilevel distribution network; and
insertion of hydraulic resistors of varying resistances in the multilevel distribution network of each stacked module.

24. The method of claim 23, wherein controlled plugging with a dispersion of solids comprises:
flowing a dilute dispersion of inert solid particles into a fluid inlet of each module, a size of the inert solid particles selected to enable them to fit into a porous structure of the chromatographic media bed and disposed to stay trapped within the porous structure;
measuring a feed pressure; and
continuing to flow the dilute dispersion until the feed pressure reaches a feed pressure corresponding to a target value of the hydraulic resistance.

25. The method of claim 24 further comprising injecting a backflushing liquid free of particulate solids into a fluid outlet of the module at a predetermined feed pressure, flow rate and time to remove solid particles that did not get trapped within the porous structure.

26. The method of claim 25 wherein the backflushing liquid is selected from at least one or a mixture of:
  deionized (DI) water;
  an aqueous buffer; and
  an organic solvent miscible with water.

* * * * *